United States Patent
Shah et al.

(10) Patent No.: US 7,200,596 B2
(45) Date of Patent: Apr. 3, 2007

(54) SYSTEM AND METHOD FOR INFORMATION RETRIEVAL REGARDING SERVICES

(75) Inventors: Dhaval N. Shah, Santa Clara, CA (US); Richard Johnson, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 864 days.

(21) Appl. No.: 09/964,268

(22) Filed: Sep. 25, 2001

(65) Prior Publication Data

US 2002/0049762 A1    Apr. 25, 2002

Related U.S. Application Data

(63) Continuation of application No. 09/175,516, filed on Oct. 20, 1998, now Pat. No. 6,298,381.

(51) Int. Cl.
*G06F 17/30* (2006.01)
(52) U.S. Cl. .................................................. 707/10
(58) Field of Classification Search .................. 707/1, 707/3, 10, 100, 2, 5, 200; 709/226, 200; 370/236; 379/112.01
See application file for complete search history.

(56) References Cited

U.S. PATENT DOCUMENTS

| | | | |
|---|---|---|---|
| 5,341,477 A | 8/1994 | Pitkin et al. ................ 395/200 |
| 5,430,727 A | 7/1995 | Callon ..................... 370/85.13 |
| 5,450,394 A | 9/1995 | Gruber et al. ................ 370/17 |
| 5,459,837 A | 10/1995 | Caccavale ............. 395/184.04 |
| 5,477,531 A | 12/1995 | McKee et al. ................ 370/17 |
| 5,509,123 A | 4/1996 | Dobbins et al. ....... 395/200.15 |
| 5,521,907 A | 5/1996 | Ennis, Jr. et al. ............. 370/17 |
| 5,812,528 A | 9/1998 | VanDervort ................. 370/235 |
| 5,819,089 A | 10/1998 | White ....................... 395/676 |
| 5,870,557 A | 2/1999 | Bellovin et al. ............. 709/224 |
| 5,872,930 A * | 2/1999 | Masters et al. ............. 709/223 |
| 5,894,556 A | 4/1999 | Grimm et al. .............. 395/200 |
| 5,905,871 A | 5/1999 | Buskens et al. ....... 395/200.75 |
| 5,917,820 A | 6/1999 | Rekhter ..................... 370/392 |
| 5,918,017 A * | 6/1999 | Attanasio et al. ........... 709/224 |

(Continued)

OTHER PUBLICATIONS

Bolosky, William J. et al, "Distributed Schedule Management in the Tiger Video Fileserver", pp. 212-223, ACM Symposium on Operating Systems Principles, Oct. 1997, Saint Malo, France.

(Continued)

*Primary Examiner*—Etienne P. LeRoux
(74) *Attorney, Agent, or Firm*—Baker Botts L.L.P.

(57) ABSTRACT

The present invention relates to a system and method for information retrieval related to a service. According to an embodiment of the present invention, two separate types of packets may be received to indicate information which is required. One type of packet is intended for information which may be directly looked up in a table, such as a routing table, while the other type of packet is intended for information which requires calculating or measuring metrics. Accordingly, if information which may be directly looked up in a routing table is requested along with information regarding metrics which need to be measured or calculated, then the routing table information is sent as soon as the requested information is looked up and the measured metric information is sent later when the requested metric is measured.

6 Claims, 20 Drawing Sheets

U.S. PATENT DOCUMENTS

| | | | |
|---|---|---|---|
| 5,983,265 A | 11/1999 | Martino, II | 709/206 |
| 5,991,809 A | 11/1999 | Kriegsman | 709/226 |
| 6,003,079 A | 12/1999 | Friedrich et al. | 709/224 |
| 6,006,264 A | 12/1999 | Colby et al. | 709/226 |
| 6,009,081 A | 12/1999 | Wheeler et al. | 370/255 |
| 6,018,516 A | 1/2000 | Packer | 370/231 |
| 6,023,733 A | 2/2000 | Periasamy et al. | 709/241 |
| 6,031,846 A | 2/2000 | Gurusami et al. | 370/508 |
| 6,041,352 A | 3/2000 | Burdick et al. | 709/224 |
| 6,049,872 A * | 4/2000 | Reiter et al. | 713/157 |
| 6,055,561 A * | 4/2000 | Feldman et al. | 709/200 |
| 6,070,190 A | 5/2000 | Reps et al. | 709/224 |
| 6,078,590 A | 6/2000 | Farinacci et al. | 370/432 |
| 6,078,956 A | 6/2000 | Bryant et al. | 709/224 |
| 6,088,717 A | 7/2000 | Reed et al. | 709/201 |
| 6,101,180 A | 8/2000 | Donahue et al. | 370/352 |
| 6,115,711 A | 9/2000 | White | 707/10 |
| 6,115,752 A * | 9/2000 | Chauhan | 709/241 |
| 6,118,765 A | 9/2000 | Phillips | 370/235 |
| 6,215,772 B1 * | 4/2001 | Verma | 370/236 |
| 6,298,381 B1 * | 10/2001 | Shah et al. | |
| 6,314,093 B1 * | 11/2001 | Mann et al. | 370/351 |
| 6,457,039 B1 * | 9/2002 | Fogelholm et al. | 709/200 |
| 6,483,835 B1 * | 11/2002 | Tanigawa et al. | 370/395.21 |
| 2004/0042596 A1 * | 3/2004 | Kim et al. | 379/112.01 |

OTHER PUBLICATIONS

Dillon, Kevin, "PNNI: Efforless Expansion for ATM Networks", Dialog (R) File 647, ATM Forum Bay Networks, Nov. 7, 1998.

Gobrial, Margret N., "Evaluation of Border Gateway Protocol (BGP) Version 4 (V4) In the Tactical Environment", Oct. 21-24, 1996, Military Communicatons Conference, 1996.

Halabi, Bassam, Internet Routing Architectures (CISCO), Macmillan Technical Publishing, Apr. 23, 1997.

IBM Redbooks, "Setting Up and Implementing ADSTAR Distributed Storage Manager/400", Apr. 3, 1995.

Inan, Kemal, "Supervisory Control and the Gateway Problem", Jun. 4, 1993, IEEE Colloquium on Discrete Event Systems.

Kosiur, IP Multicasting: The Complete Guide to Interactive Corporate Networks, Wiley Computer Publishing, Apr. 1, 1998.

Liu, Zhao, et al., "A Scalable Wireless Virtual LAN", International Conference on Mobile Computing and Neetworking, Nov. 11-12, 1996, White Plains, NY, pp. 176-186.

Morrissey, Peter, "Multihoming With BGP4", Network Computing, 1999, No. 1025, p. 117.

Chapter 2.2 Ping of TCP RFC 1739 available at www.ietf.org or ftp://ftp/isi/edu/in-notes/rfc1739.txt.

Shiner, Mitchell, "Scott Meuller Library—Computer Dictionary", Que, Macmillan Computer Publishing, May 20, 1998.

Smith, Bradley R., et al, "Securing the Border Gateway Routing Protocol", Global Telecommunications Conference, 1996, Nov. 8-22, 1996.

Tsuchiya, Paul F., "Internet Routing over Large Public Data Networks using Shortcuts", Bellcore, tsuchiya@thumper.bellcore.com.

"Cisco Distributed Director", 1996, Cisco Systems, Inc.

* cited by examiner

| Server ID | Server Portion |
|---|---|
| A | 7 |
| B | 8 |
| C | 2 |
| D | 2 |
| E | 5 |

Total = 24

|            | MS 1 | MS 2 | MS 3 | MS 4 |
|------------|------|------|------|------|
| Route Type | ISIS | ISIS | OSPF | OSPF |
| Type #     | 1    | 2    | 3    | 3    |
| IGP Metric | 10   | 20   | 30   | 40   |

Figure 19

SYSTEM AND METHOD FOR INFORMATION RETRIEVAL REGARDING SERVICES

This is a Continuation of application Ser. No. 09/175,516, filed Oct. 20, 1998 now U.S. Pat. No. 6,298,381, which is hereby incorporated by reference.

FIELD OF THE INVENTION

The present invention relates to accessing data in a network environment, such as the Internet, via a computer system. In particular, the present invention relates to a system and method for information retrieval related to a service.

CROSS REFERENCE TO RELATED APPLICATION

This application claims priority to U.S. Pat. No. 6,260,070, entitled "System and Method for Determining a Preferred Mirrored Service in a Network by Evaluating a Border Gateway Protocol", filed Jun. 30, 1998, and to U.S. Pat. No. 6,446,121, entitled "System and Method for Measuring Round Trip Times in a Network Using a TCP Packet", filed May 26, 1998, both of which are assigned to Cisco Technology, Inc. and both of which are herein incorporated by reference. This application is also related to U.S. Pat. No. 6,205,427, entitled "Apparatus and Method for Performing Traffic Redirection via a Distributed System Using a Portion Metric", filed Oct. 20, 1998 which is also assigned to Cisco Technology, Inc. and is herein incorporated by reference.

BACKGROUND OF THE INVENTION

With the growing popularity of the Internet, providing speedy access to a requested location on the Internet is fast becoming a significant issue. For example, when a popular web page is hosted by a single computer, the Internet traffic to that computer can be overwhelming. To manage this problem, several computers can be utilized to host the same web page such that each hosting computer, typically referred to as a server, maintains a copy of the web page. If there are many servers at the same location, then the network connection to that location can become choked during a time of high Internet traffic. To avoid choking the network connection, mirrored servers are often located at different sites. These sites are herein referred to as mirrored sites. The use of multiple computers to host a network service, such as a web page, is typically referred to as mirrored services.

FIG. 1 is a block diagram illustrating a path taken by a clients request for a particular address. A client may be any entity which attempts to access a service. For example, the client may be a user, a company, or an automated computer system. FIG. 1 shows a client 10 requesting an address for a network site, such as www.cisco.com, from a local domain name server 12. The client's local domain name server 12 may be a service such as Netcom or AT&T. The local domain name server 12 then eventually learns the address of one of the mirrored services 14A–14B, and replies to the client 10 with the address of one of the mirrored services 14A–14B.

FIG. 2 illustrates a basic organization of the Internet. The Internet includes groups of networks and routers which combine to create an autonomous systems (ASs) 50A–50E. A client may be located in one AS, such as AS 50A, while the service that the client is attempting to access may be located in another AS, such as AS 50E. In order to reach service 14, the request from client 10 may be passed from AS 50A to AS 50B through AS 50C, through AS 50D, and finally reaching service 14 at AS 50E.

In a mirrored service environment, the client 10 may be in one AS, such as AS 50A, while the mirrored services may be located in various different autonomous systems, such as AS 50E and AS 50C. An address of one of these mirrored services is typically needed in response to the client's request.

There are several conventional ways of determining which mirrored service should be assigned to a requesting client. A selection of a mirrored service can be based on several factors. Ideally, the requested address should be returned to the client very quickly and downloaded into the client's computer system as quickly as possible. The time between the request being sent out by the client and the address being received is referred to as latency. The time it takes to download the requested address is typically determined by the bandwidth.

One conventional service assignment scheme is a round robin scheme. The round robin simply takes turns on which mirrored service is to be used. A potential problem with the round robin scheme is that it does not take into consideration the various loads of the mirrored services at any given time. Additionally, the round robin scheme also fails to take into consideration the location of the user. Accordingly, the two factors of latency and bandwidth are not typically considered in the round robin scheme.

When the service is a mirrored service, the mirrored services may be located in different autonomous systems. Some service selection methods attempt to measure a metric between the client 10 and each of the services 14. Metric is herein meant to include a measurement of some characteristic of a connection, for example, a unit which indicates distance or time or both. For example, one such method measures "hop count", wherein the number of autonomous systems located between client 10 and service 14 are counted. The mirrored service with the smallest hop count may be considered the best selection for that particular client.

Although the metric measurement methods are effective in many situations, there may be situations in which it is an advantage to have an alternate method for determining which mirrored service is best for a particular client. For example, one such situation is if the hop count between a client and a first server is the same as the hop count between the client and a second server. Although the hop count may be the same, the actual distances between the client and the first service and the client and the second service may be different. Another example of when an alternative method would be beneficial, is when an autonomous system is so large as to encompass more than one mirrored service. A client within that same autonomous system would not be able to use the hop count in order to determine which mirrored service is better for that client.

It would be desirable to have an alternative reliable system and method to determine which mirrored service is the best selection for a given client. It would also be desirable to quickly and efficiently obtain information regarding mirrored services to facilitate the selection of a mirrored service. The present invention addresses such a need.

SUMMARY OF THE INVENTION

The present invention relates to a system and method for information retrieval related to a service. According to an embodiment of the present invention, two separate types of query packets may be received to indicate information which is required. One type of packet is intended for information which may be directly looked up in a table, such as a routing table, while the other type of packet is intended for information which requires calculating or measuring metrics. Accordingly, if metric information which may be directly looked up in a routing table is requested along with information regarding metrics which need to be measured or calculated, then the routing table information is sent as soon as the requested information is looked up and the measured metric information is sent later when the requested metric is measured.

A method according to an embodiment of the present invention for retrieving information regarding a service in a network environment is presented. The method comprising receiving a query packet; determining a class of query, wherein the class of query is indicated by the query packet; and determining at least one metric, the at least one metric being identified by the query packet.

In another aspect of the present invention, a system according to the present invention for retrieving information regarding a service in a network environment is presented. The system comprising an interface to receive a query packet. The system also includes a processor coupled to the interface, wherein the processor is configured to determine a class of query. The class of query is indicated by the query packet. The processor is also configured to determine at least one metric, the at least one metric being identified by the query packet.

Another system according to the present invention for retrieving information regarding a service in a network environment is also presented. The system comprising a first processor configured to send a query packet; and an interface configured to receive the query packet. The system also includes a second processor coupled to the interface, the second processor being configured to determine a class of query, wherein the class of query is indicated by the query packet. The second processor is also configured to determine at least one metric, the at least one metric being identified in the query packet. The second processor is also configured to send the at least one metric to the first processor.

BRIEF DESCRIPTION OF THE DRAWINGS

FIG. 15 is an illustration of an example of the use of service portions.

FIG. 19 is an illustration of an example of metric comparisons according to an embodiment of the present invention.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
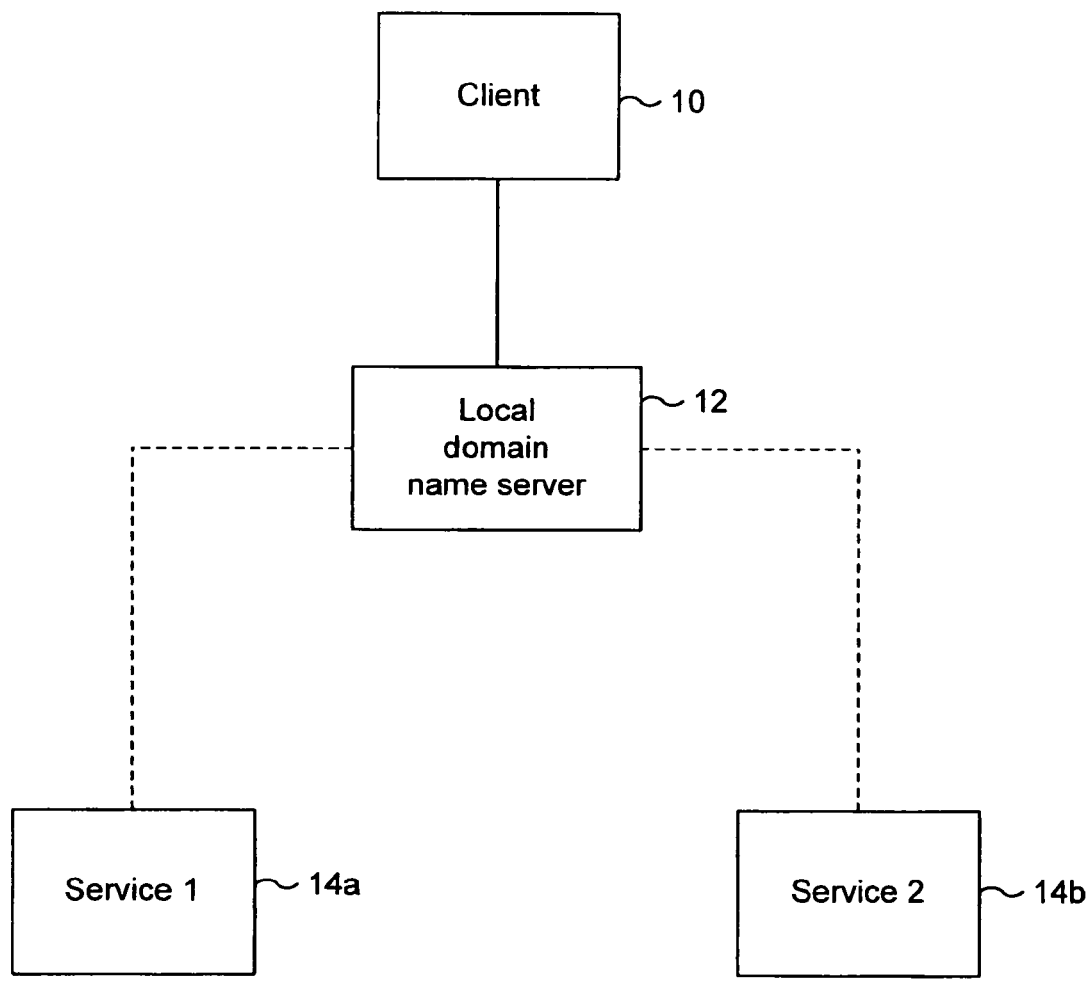
FIG. 1 is a block diagram illustrating a path taken by a user's request for a particular address.
Figure 2:
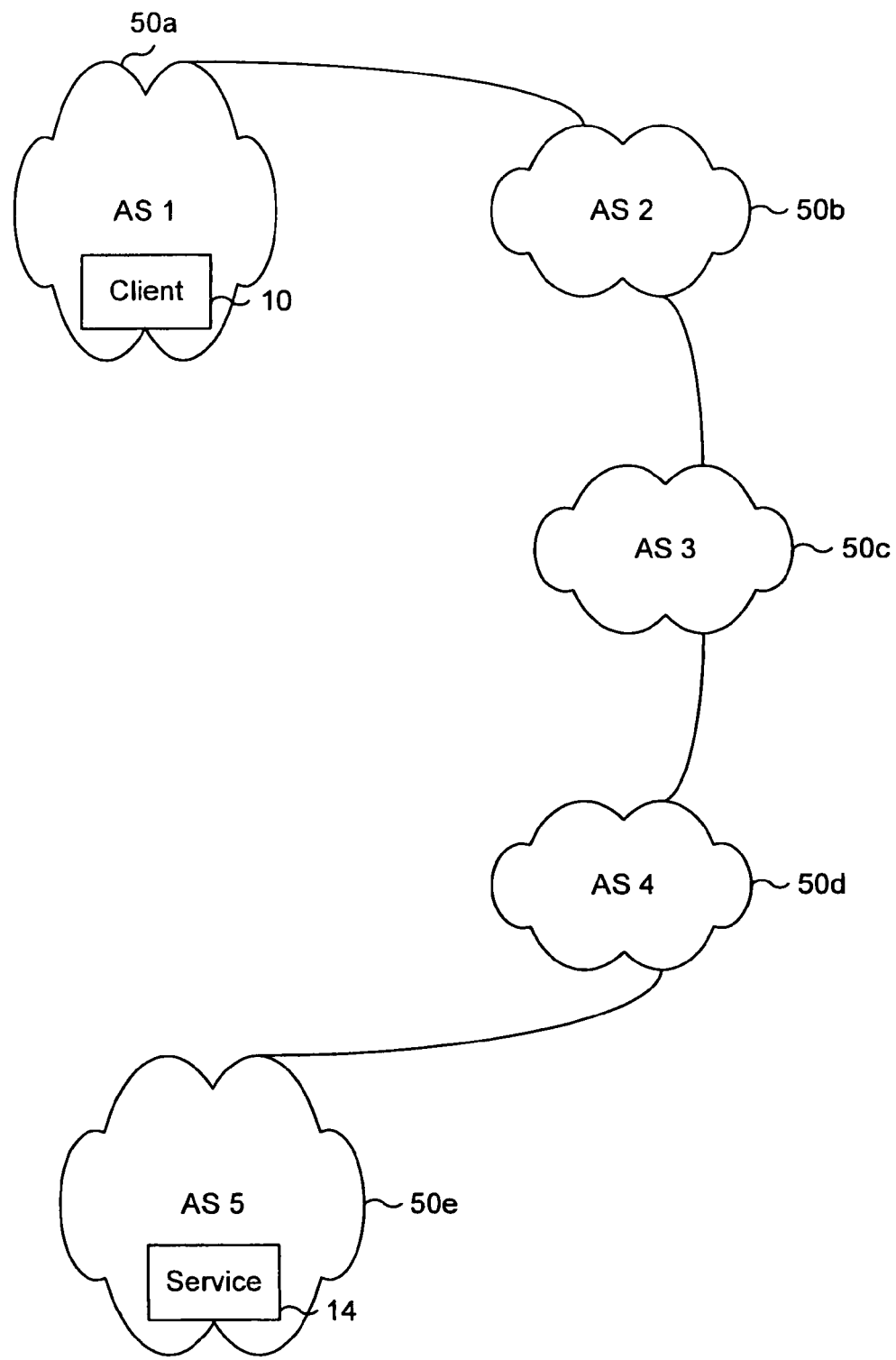
FIG. 2 is an illustration of a basic organization of the Internet.
Figure 3:
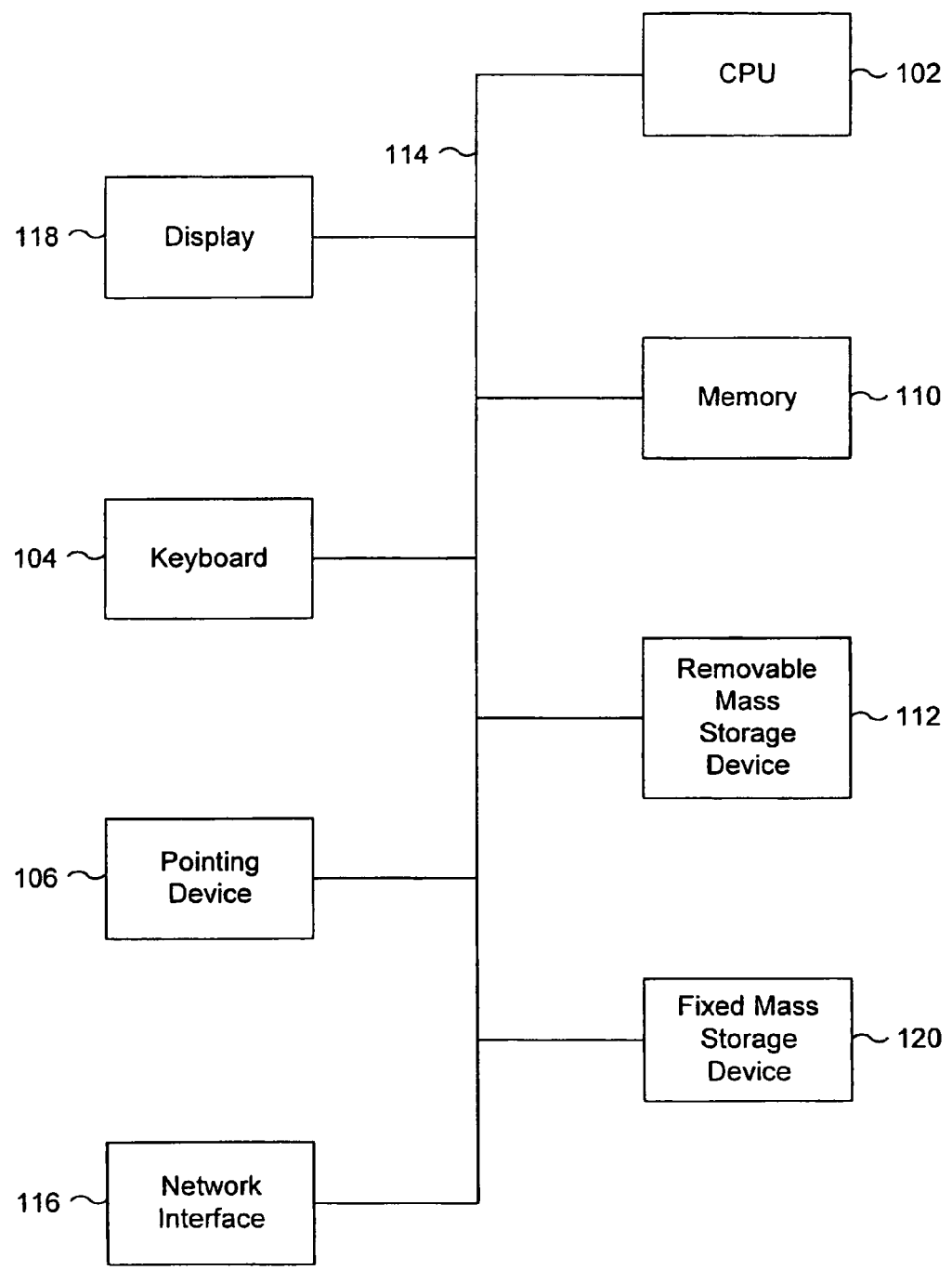
FIG. 3 is a block diagram of a computer system suitable for implementing the present invention.

FIG. 3 is a block diagram of a general purpose computer system 100 suitable for carrying out the processing in accordance with one embodiment of the present invention. FIG. 3 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access to other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 3 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 4:
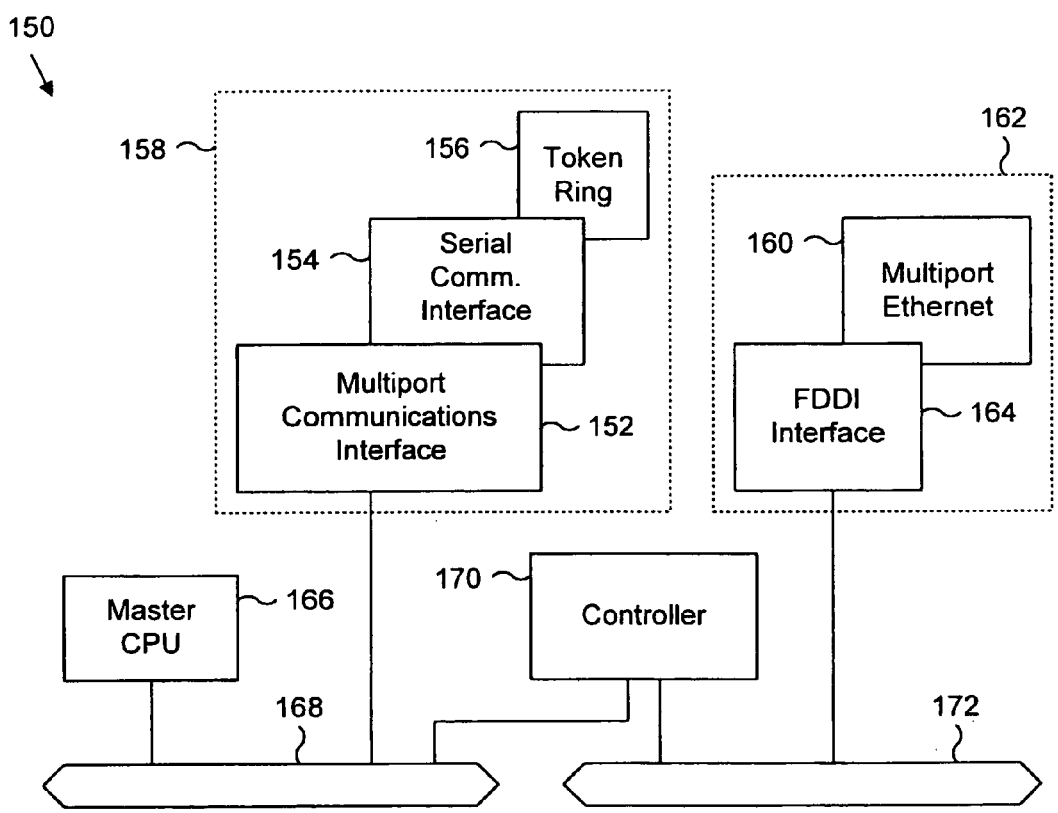
FIG. 4 is a block diagram of a router suitable for implementing the present invention.

FIG. 4 is a block diagram of an example of a router 150 suitable for implementing an embodiment of the present invention. The router 150 is shown to include a master central processing unit (CPU) 166, low and medium speed interfaces 158, and high speed interfaces 162. The CPU 166, may be responsible for such router tasks as routing table computations and network management. It may include one or more microprocessor chips selected from complex instruction set computer (CISC) chips (such as the Motorola 68040 Microprocessor), reduced instructions set computer (RISC) chips, or other available chips. Non-volatile RAM and/or ROM may also form part of CPU 166. However, there are many different ways in which memory can be coupled to the system.

The interfaces 158 and 162 are typically provided as interface cards. Generally, they control the sending and receipt of data packets over the network and sometimes support other peripherals used with the router 150. Examples of interfaces that may be included in the low and medium interfaces 158 include a multiport communications interface 152, a serial communications interface 154, and a token ring interface 156. Examples of interfaces that may be included in the high speed interfaces 162 include a fiber distributed data interface (FDDI) 164 and a multiport Ethernet interface 160. Each of these interfaces (low/medium and high speed) may include (1) a plurality of ports appropriate for communication with the appropriate media, and (2) an independent processor such as the 2901 bit slice processor (available from Advanced Micro Devices Corporation of Santa Clara, Calif.), and in some instances (3) volatile RAM. The independent processors control such communication intensive tasks as packet switching and filtering, and media control and management. By providing separate processors for the communication intensive tasks, this architecture permits the master microprocessor 166 to efficiently perform routing computations, network diagnostics, security functions, etc.

The low and medium speed interfaces are shown to be coupled to the master CPU 166 through a data, control, and address bus 168. High speed interfaces 162 are shown to be connected to the bus 168 through a fast data, control, and address bus 172 which is in turn connected to a bus controller 170. The bus controller functions are provided by a processor such as a 2901 bit slice processor.

Although the system shown in FIG. 4 is an example of a router suitable for implementing an embodiment of the present invention, it is by no means the only router architecture on which the present invention can be implemented. For example, an architecture having a single processor that handles communications as well as routing computations, etc. would also be acceptable. Further, other types of interfaces and media could also be used with the router.

Figure 5:
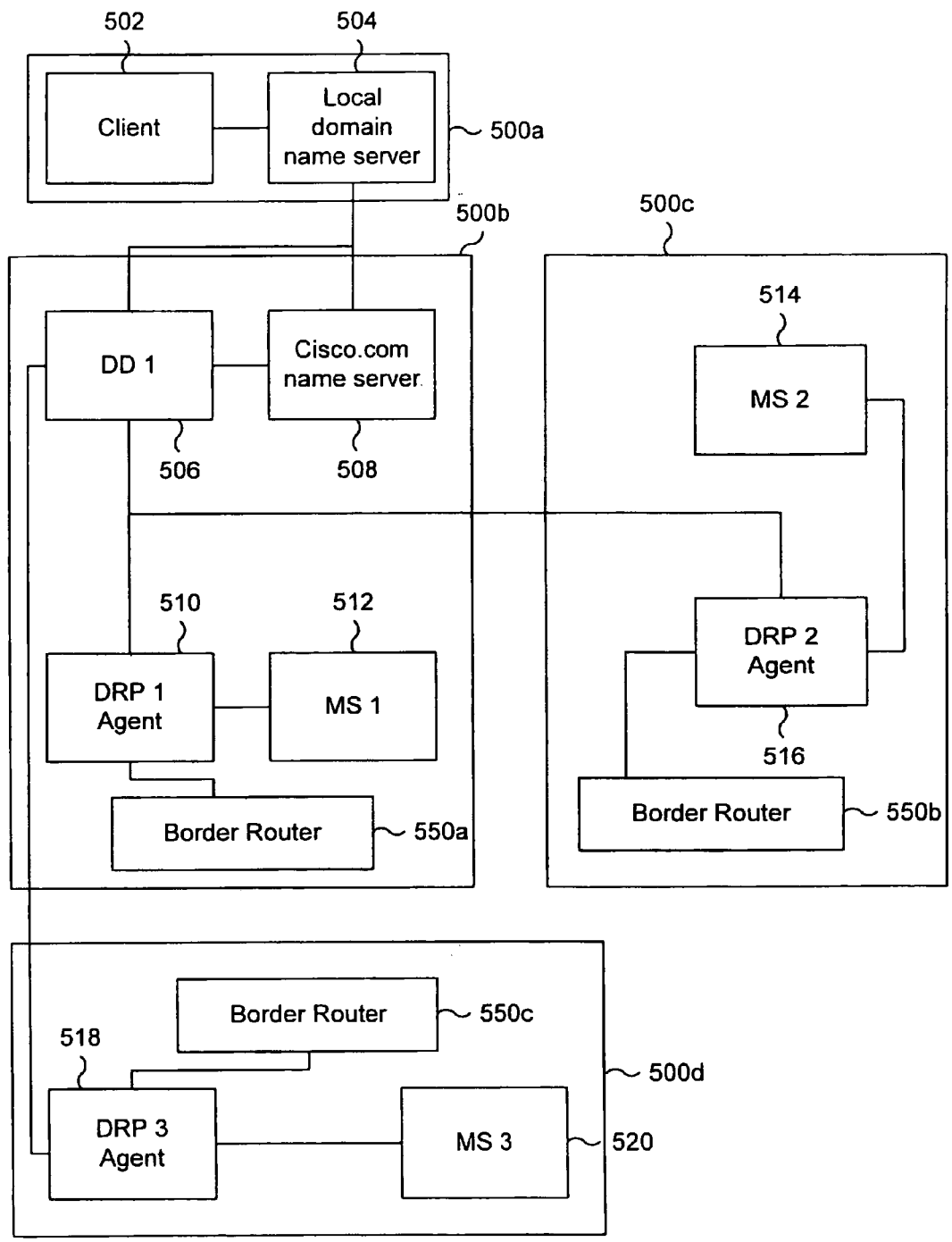
FIG. 5 is a block diagram of a multi-autonomous system according to an embodiment of the present invention for selecting a service.

FIG. 5 is a block diagram of a multi-autonomous system according to an embodiment of the present invention for selecting a service. Although the examples herein are presented in terms of services being provided by servers located on the Internet, the services according to an embodiment of the present invention may be provided by any device which may be accessible via any network. Examples of such devices include a digital telephone, as well as any appliance capable of being accessible via a network such as the Internet.

FIG. 5 shows autonomous systems 500A–500D. A client 502 is shown to be coupled to a local domain server 504 within autonomous system 500A. In this example, the client 502 requests the IP address of a host name, such as www-.cisco.com. The client's request is sent to the local domain name server 504, which in turn eventually sends a request to the host name server 508.

In this example, the host name server is cisco.com name server. The host name server 508 may be located in a separate autonomous system, such as autonomous system 500B. The host name server 508 then interacts with a distributed director 506 and a director response protocol agent 510 in order to determine which mirrored service (MS) 512, 514, or 520, is the best selection to respond to the client's request.

The distributed director 506 is a system according to an embodiment of the present invention which is capable of transparently directing a client to the best mirrored service. The distributed director 506 may have a standard router configuration, such as the router system shown in FIG. 4, or it may be a standard computer system, such as the computer shown in FIG. 3. In either case, the distributed director 506 is configured to select a service according to the embodiment of the present invention, as described in conjunction with FIGS. 7–16 and 19–20 for example.

The director response protocol (DRP) agent 510 is a system according to an embodiment of the present invention that is capable of transparently obtaining information regarding a server, such as looking up information in a table, or measuring or calculating metrics. "Transparent" is herein meant to indicate a process which is not seen by a user. The DRP agent 510 may have a standard router configuration, such as the router system shown in FIG. 4, or it may be a standard computer system, such as the computer shown in FIG. 3. In either case, the DRP agent 510 is configured to obtain and communicate information, such as information regarding a server, according to the embodiment of the present invention, as described in conjunction with FIGS. 7–18 for example.

The distributed director 506 sends a request to each DRP agent 510, 516, and 518 in the various autonomous systems 500B–500D in which the mirrored services 512, 514, and 520 are located. The distributed director 506 requests of each DRP agent 510, 518, 516, a metric associated with the client. For example, the distributed director 506 may ask for a predetermined Border Gateway Protocol (BGP) attribute for a prefix associated with the client.

The Border Gateway Protocol information is typically used by border routers 550a–550c for purposes of sharing information between autonomous systems. Border routers 550a–550b are routers designed to communicate between autonomous systems. By using the Border Gateway Protocol information, autonomous system A will have appropriate information to be able to communicate with autonomous system B.

Border routers 550a–550c may contain attributes for prefixes associated with various clients. A prefix indicates a set of IP addresses assigned to an autonomous system. For example, a unique address of a client may be 71.69.22.0, wherein the last numerical value may vary from 0 to 255. Although each user in an autonomous system may have a unique address, 256 of the users may have the same prefix. For each prefix, there may be a set of attributes associated with it. These attributes include supplemental information for each prefix. A BGP attribute is meant herein to include supplemental information for the prefix associated with the user which is stored in a table in a border router.

Each DRP agent 510, 516, 518, then looks up the requested Border Gateway Protocol (BGP) attribute from the nearest border router 550a–550c. Examples of BGP attributes include Multi Exit Discriminator (MED), community attribute, and local preference. Each DRP agent 510, 516, 518, then replies to the distributed director 506 with its own BGP attributes. The distributed director 506 can then compare the various attributes and determine the best mirrored service. An example of a best mirrored service is the mirrored service associated with the "best" BGP attribute. An example of a "best" BGP attribute is an attribute which meets a predetermined criteria. The distributed director 506 can then reply to the local domain name server 504 with an IP address for the selected mirrored service.

Figure 6:
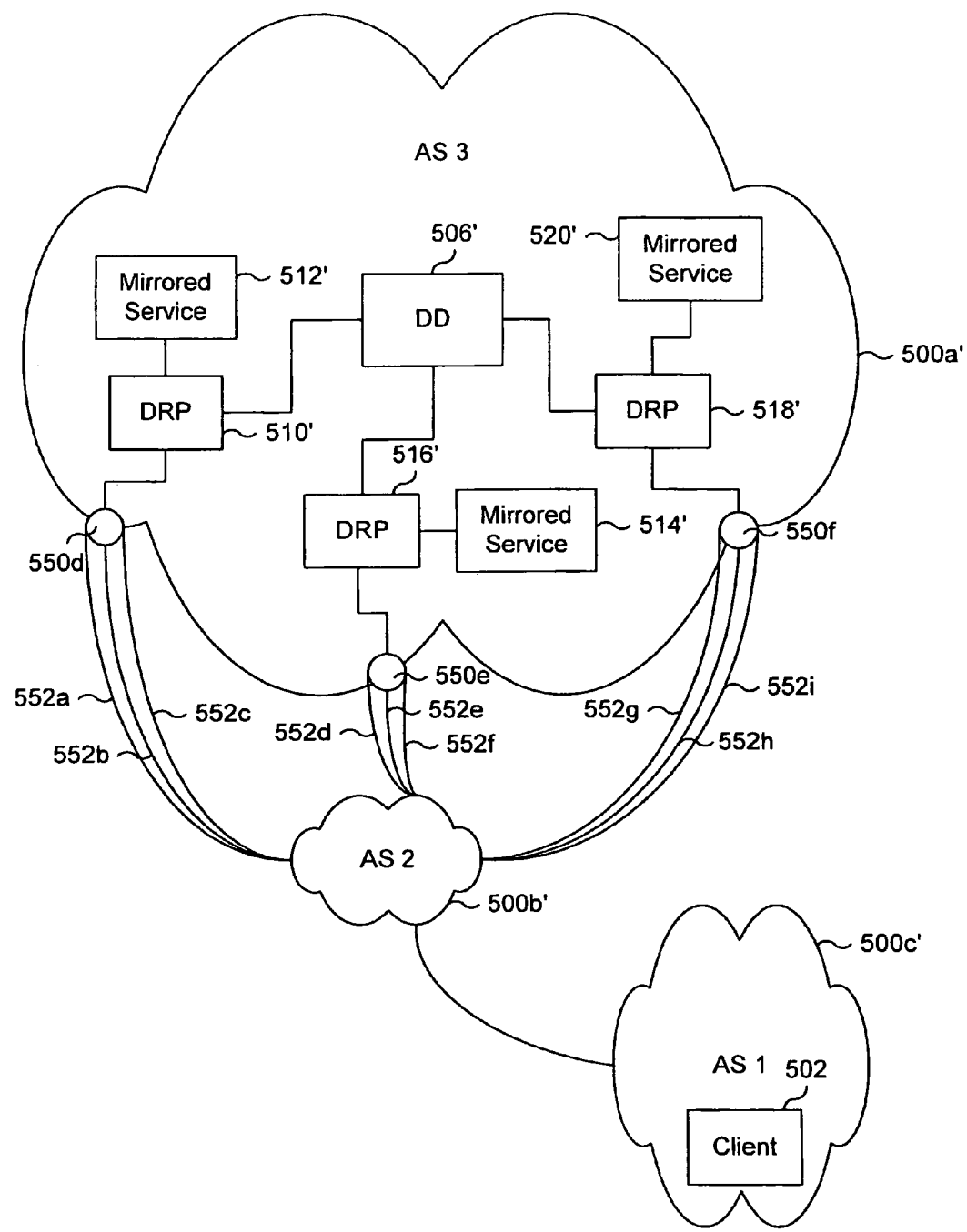
FIG. 6 is a block diagram of a system according to an embodiment of the present invention for selecting a service wherein multiple mirrored services are included in a single autonomous system.

FIG. 6 is a block diagram of a system according to an embodiment of the present invention for selecting a mirrored service, wherein a single autonomous system is shown to include multiple mirrored services. FIG. 6 is shown to include autonomous systems 500A'–500C'. The client 502 is shown to be located in autonomous system 500C'. Autonomous system 500C' is shown to be coupled to autonomous system 500D', which in turn is shown to be coupled autonomous system 500A'.

In 500A', several mirrored services 512', 514', and 520' are shown to be included in a single autonomous system 500A'. The mirrored services are shown to be coupled to DRP agents 510', 516', and 518', which in turn are coupled to a distributed director, 506'. Each of the DRP agents 510', 516', and 518', are shown to be coupled to a border router 550d–550f. Although an autonomous system normally includes multiple routers, a few are selected to be border routers 550*d*–550*f*. These border routers 550*d*–550*f* perform the function of facilitating communication outside of AS 500A'.

In this example, the border routers 550*d*–550*f* are shown to be coupled to autonomous system 500B'. The border routers 550*d*–550*f* are coupled to AS 500B' via connections 552A–552I. A multi-exit discriminator (MED) value dynamically indicates which link 552A–552C to use between AS 500B' and AS 500A' by border router 550*d* to send data for a particular prefix. For example, client 502 of AS 500C' will have a prefix to its IP address. This particular prefix will have an associated MED value which indicates to border router 550*d* which link 552A–552C to use for the prefix of client 502. Likewise, a MED value associated with the prefix for client 502 will also indicate which link 552D–552F to use for border router 550*e*, and another MED value will indicate which link 552G–552I to use for border router 550*f* for a particular clients' prefix. Typically, the lower the MED value the more preferred a particular link is for use with a particular prefix.

Figure 7:
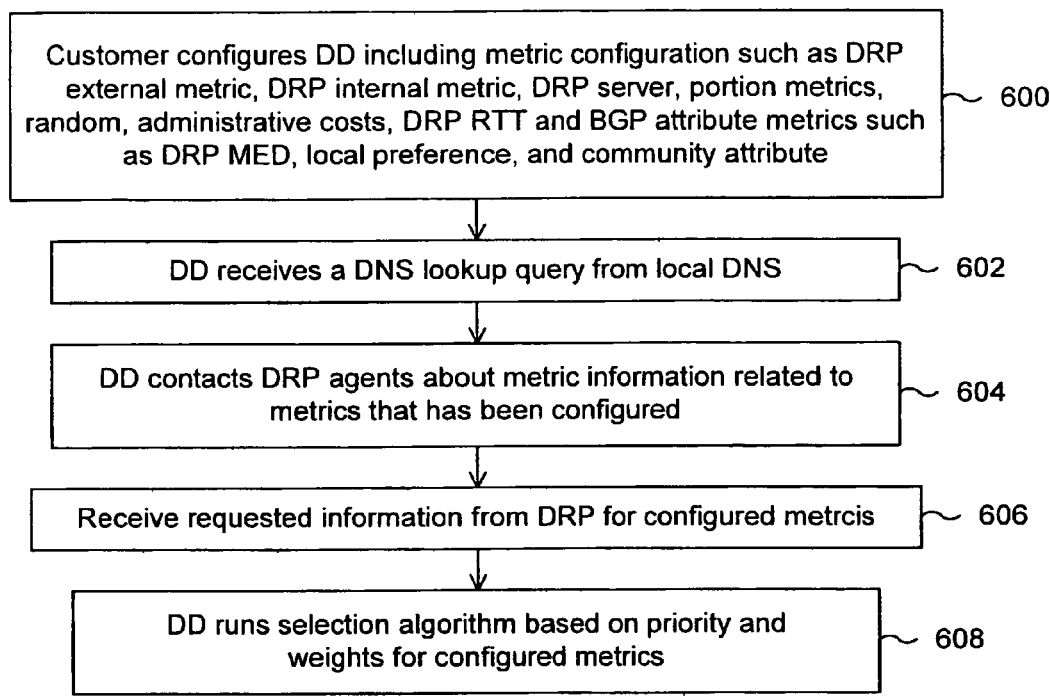
FIG. 7 is a flow diagram of a method according to an embodiment of the present invention for selecting a service.

FIG. 7 is a flow diagram of a method according to an embodiment of the present invention for selecting a mirrored service. A user, such as a network administrator, configures the distributed director (step 600). The user configuration may include types of metrics used for service selection, priorities and weights for these configured metrics, service availability, and default service determinations. Examples of classes of metrics to be used include DRP external metric, DRP internal metric, DRP server metric, DRP server metric, DRP round trip time (RTT), portion metrics, and BGP attribute metrics such as DRP MED, local preference, and community attribute.

The distributed director receives a domain name server (DNS) lookup query from a local DNS (step 602). The distributed director then contacts DRP agents about metric information related to metrics that has been configured by the user (step 604). The distributed director then receives the information that it requested from the DRP agents for the configured metrics (step 606). The distributed director then runs a selection algorithm based on priority and weights for configured metrics (step 608). Examples of selection algorithms are later discussed in conjunction with FIGS. 9–20.

Priorities are user configurable. For example, a metric, such as round trip time, may be configured to have a priority of one, while a metric such as BGP MED may be configured to have a priority of two. Accordingly, the default metric to be used in this example is round trip time. If the round trip time of two mirrored services are the same, then the next priority metric is utilized, in this example BGP MED metric.

Weights are also configured by the user when two metrics of the same priority level are compared. For example, the user may configure two different types of IGP to be at the same priority and to be compared but with different weights. For example, autonomous system hop counts may have a lower weight than bandwidth measurements. Another example of the use of weights is when a first metric and a second metric are to be added to obtain a final metric, such as autonomous system hop counts between a client and a DRP and AS hop counts between the DRP and a mirrored service. The user may choose to give a higher weight to the AF hop count between the client and DRP than to the AS hop count between the DRP and the mirrored service since the distance between the DRP and the mirrored service is most likely substantially smaller than the distance between the client and the DRP.

Figure 8:
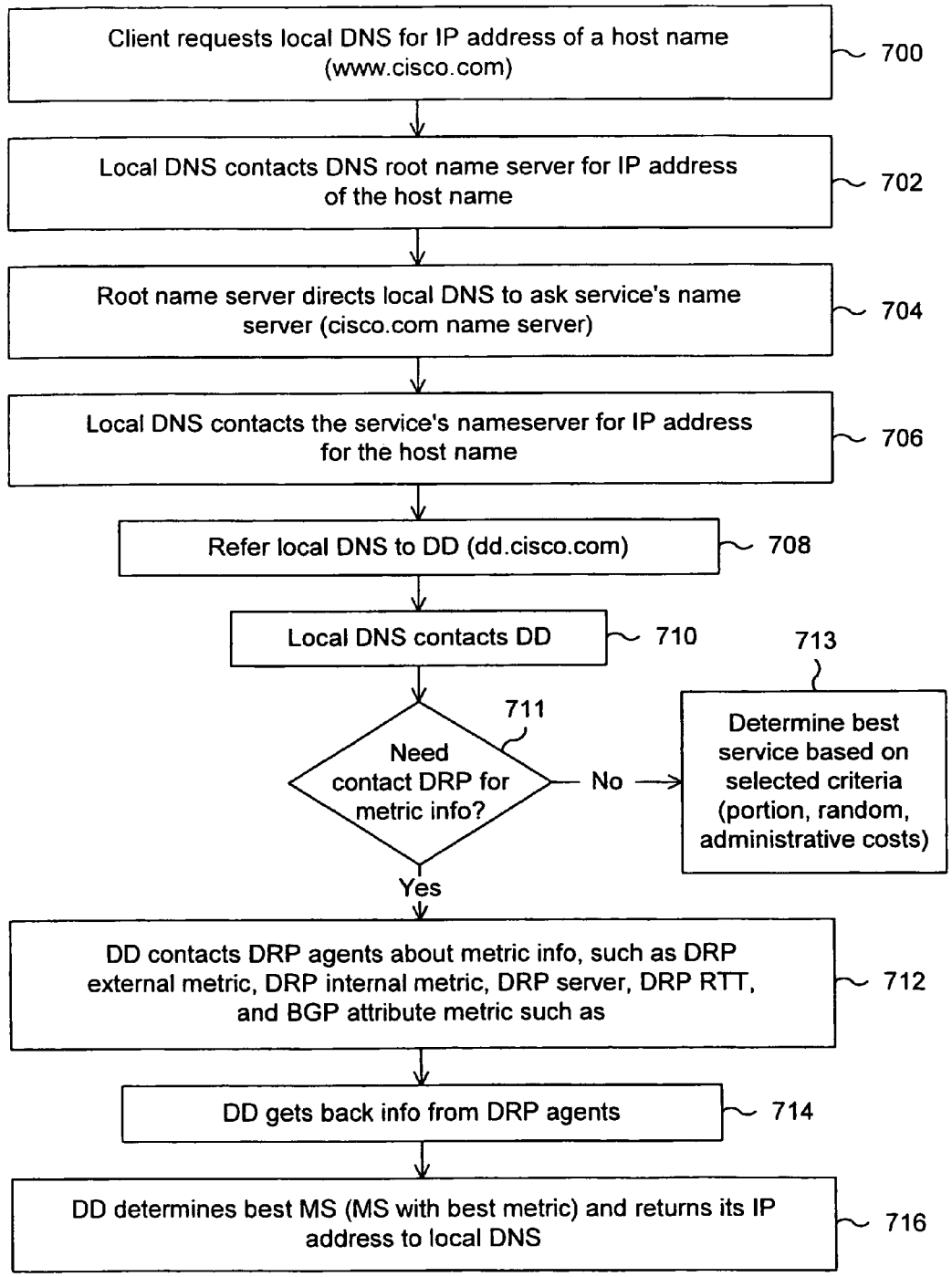
FIG. 8 is another flow diagram of a method according to an embodiment of the present invention for selecting a service.

FIG. 8 is another flow diagram of a method according to an embodiment of the present invention for selecting a mirrored service. The method shown in FIG. 8 may be applied to either the system shown in FIG. 5 or the system shown in FIG. 6. The client requests the local domain name server for an IP address of a host name, such as www.cisco.com (step 700). The local domain name server then contacts a domain name server root name server for an IP address of the host name (step 702). It is common for local domain name servers to contact a root name server for further direction. Root name servers and their uses are well known in the art.

The local domain name server is eventually directed to ask the requested service's name server, such as cisco.com name sever (step 704). The local domain name server then contacts the service's name server for an IP address of the host name (step 706). The local domain name server is then referred to the distributed director, for example to dd.cisco.com (step 708). The local domain name server then contacts the distributed director (step 710).

It is then determined whether the DRP agents need to be contacted for metric information (step 711). If the DRP agents do not need to be contacted for metric information in step 711, then a "best" service is determined based on the predetermined selection criteria (step 713). Examples of configured selection criterias that do not need to contact DRP agents are portion, random, or administrative costs, since the distributed director itself may follow these criterias.

When using portion metrics, each available service is assigned a portion of the usage such that a service is identified as the "best" service a certain percentage of the total number of times a "best" service is selected as a resolution of a requested host name. Further details of the use of portion metrics as a selection criteria will later be discussed in conjunction with FIG. 15.

If the distributed director is configured for random metrics, then a random number from each distributed service is selected and the best service is defined in a predetermined way, such as the one with the smallest random number assignment. Use of this metric by itself results in random redirection of clients to the relevant mirrored services. Since this metric requires no routing table information, accordingly it does not trigger DRP requests to the DRP server agents.

If the distributed director is configured for administrative cost, then a statistical preference of one service over another is specified. The administrative cost configuration may also be used when taking a server out of service or when adding new service hosts. This metric requires no routing table information and will not trigger DRP requests to the DRP server agents.

If it is determined that the DRP agents should be contacted to facilitate determination of a "best" service (step 711), then the distributed director contacts the DRP agents, located near the various mirrored services, regarding metric information (step 712). As previously stated, metric information can include distance information as well as time information. The DRP agents are preferably contacted for any type of additional information that the distributed director needs to facilitate a selection of the "best" service based on its configuration. Examples of metric information that may require the distributed director to contact the DRP agents include DRP round trip time, DRP external metrics, DRP internal metrics, DRP server metrics, and BGP attributes such as DRP MED, local preferences, and community attributes.

DRP round trip time may be obtained by timing round trip times between a packet sent from each DRP to the approximate client's location and a return response to the DRP which originated the packet. Further details of the DRP round trip time will later be discussed in conjunction with FIG. 14.

The DRP external metric is obtained by sending DRP queries which ask all appropriate DRP agents for the border gateway protocol (BGP) distances between the DRP agents and the client originating the distributed director query. An example of this distance is the number of BGP autonomous system (AS) hops between the DRP server agent and the AS of the client requesting the Internet service. For example, in the system shown in FIG. 5, DRP agent 518 of AS 500D may give a BGP distance of two hops, which include AS 500B and AS 500A, to reach the client 502.

The DRP internal metric is obtained by sending DRP queries which ask all appropriate DRP agents for the internal gateway protocol (IGP) route metric between them and the closest BGP border routers (the edge of the BGP AS) in the direction of the client originating the distributed director query. For example, in the system shown in FIG. 5, the internal metric may be the metric, such as distance or transmission time, between DRP agent 518 and border router 550C, both of AS 500D. This distance can be used along with the DRP external metric in order to get a finer distance calculation between the DRP server agents and the client requesting the Internet service.

The DRP server metric is obtained by sending DRP queries which ask all appropriate DRP agents for the internal gateway protocol (IGP) route metric between them and the mirrored service(s) that they support. For example, in the system shown in FIG. 5, the DRP server metric may be the metric, such as the distance or transmission time, between the DRP agent 518 and MS 520, both of AS 500D. This distance can be used with the DRP internal metric in order to get a finer distance calculation between the mirrored services and edge of the BGP AS in the direction of the client originating the distributed director query. If a BGP border router is used as a DRP agent, the DRP server metrics will return the IGP route metric between the mirrored service and the BGP border router (AS edge). Because the DRP server metrics should not change frequently, the distributed director may automatically issue DRP server queries (and cache the results) every predetermined period, such as ten minutes (when this metric is configured).

A BGP attribute is meant herein to include supplemental information for the prefix associated with the user which is stored in a table in a border router. Examples of BGP attributes which may be used in accordance with embodiments of the present invention include multi-exit discriminator (MED), community attribute, and local preference. Further details of the use of metrics based on BGP attributes will later be discussed in conjunction with FIGS. 10–13.

The distributed director then receives the requested information back from the DRP agents (step 714). Based on this information, the distributed director determines a "best" mirrored service (MS) and returns the selected mirrored service's IP address to the local DNS (step 716). An example of a "best" mirrored service is the mirrored service with the best metric.

Figure 9:
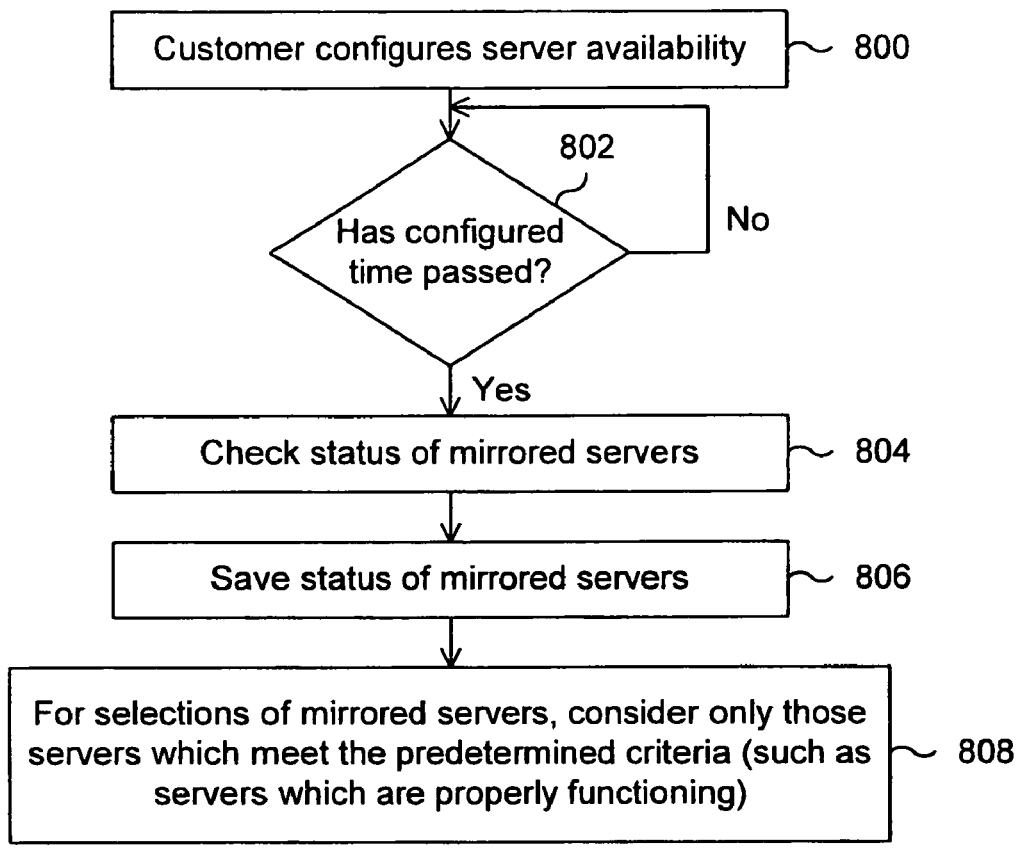
FIG. 9 is a flow diagram of a method according to an embodiment of the present invention for determining service availability.

FIG. 9 is a flow diagram of a method according to an embodiment of the present invention for checking service availability. A user, such as a network administrator, may configure service availability (step 800). In configuring service availability, the user may configure whether mirrored services should be checked periodically for availability. It is then determined whether a predetermined configured time has passed (step 802). When the user configures service availability, the user may configure a time period between checking for the availability of a service. This configured time period may be in granularities of less than a minute, such that the service availability may be checked several times per minute. When the predetermined configured time has passed, then the status of mirrored services are checked (step 804). For example, the status of mirrored services may be checked by attempting a transmission control protocal (TCP) connection to configured port(s) at each service when the predetermined configured time has passed. If the connection succeeds, then the service may be assumed to be available, and it may be assumed unavailable if the connection does not succeed.

The status of each mirrored service is then saved (step 806). For selections of mirrored services, only those services which meet the predetermined criteria, such as services which are properly functioning, will be considered (step 808). Accordingly, when the method shown in FIGS. 7 and 8 are executed, if the network administrator has configured for service availability, only those services which are properly functioning will be considered as a candidate for the "best" service.

Figure 10:
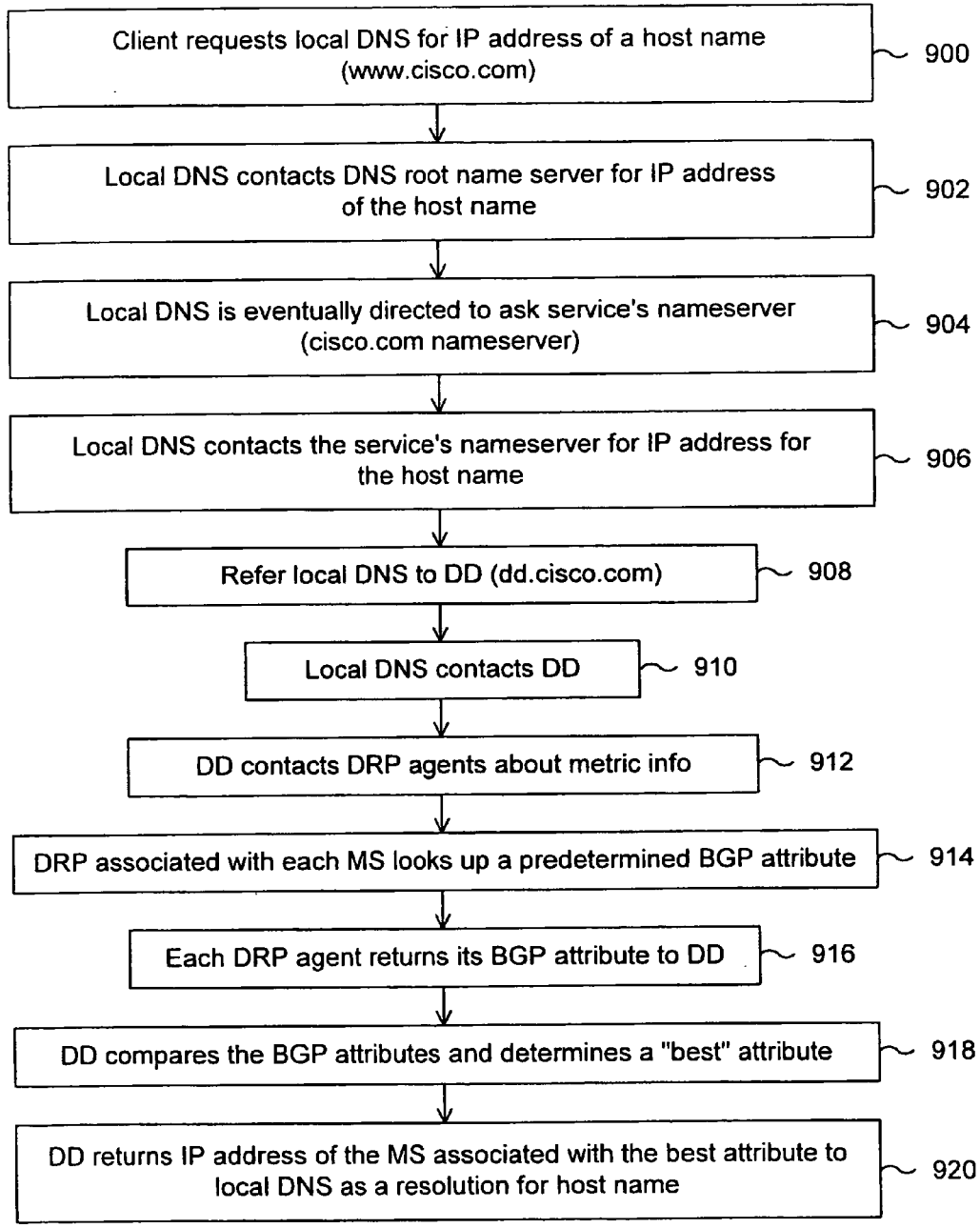
FIG. 10 is a flow diagram of a method according to an embodiment of the present invention for selecting a mirrored service, using a border gateway protocol (BGP) attribute.

FIG. 10 is a flow diagram of a method according to an embodiment of the present invention for selecting a mirrored service using a border gateway protocol (BGP) attribute for a situation when a user has configured the distributed director for using BGP attributes for such a selection. As previously mentioned, examples of BGP attributes include community attributes, MED values, and local preferences. Further details of these attributes will later be discussed in conjunction with FIGS. 11–13.

The method shown in FIG. 10 may be applied to either the system shown in FIG. 5 or the system shown in FIG. 6. The client requests the local domain name server for an IP address of a host name, such as www.cisco.com (step 900). The local domain name server then contacts a domain name server root name server for an IP address of the host name (step 902). It is common for local domain name servers to contact a root name server for further direction. Root name servers and their uses are well known in the art.

The local domain name server is eventually directed to ask the requested service's name server, such as cisco.com name sever (step 904). The local domain name server then contacts the service's name server for an IP address of the host name (step 906). The local domain name server is then referred to the distributed director, for example to dd.cisco.com (step 908). The local domain name server then contacts the distributed director (step 910). The distributed director then contacts the distributed response protocol (DRP) agents, located near the various mirrored services, regarding metric information (step 912). Each DRP agent associated with each mirrored service looks up a predetermined Border Gateway Protocol (BGP) attribute associated with a prefix of the client (step 914).

A prefix indicates a set of IP addresses assigned to an autonomous system. For example, a unique address of a client may be 71.69.22.0, wherein the last numerical value may vary from 0 to 255. Although each user in an autonomous system may have a unique address, 256 of the users may have the same prefix. For each prefix, there may be a set of attributes associated with it. These attributes include supplemental information for each prefix. A BGP attribute is meant herein to include supplemental information for the prefix associated with the user which is stored in a table in a border router.

Each DRP agent then returns its BGP attribute to the distributed director (step 916). The distributed director then compares the BGP attributes associated with the client's prefix and determines a "best" attribute (step 918). As previously stated, the "best" attribute may be an attribute which meets a predetermined criteria. The distributed director then returns the IP address of the mirrored service associated with the best attribute to the local DNS as a resolution for the host name (step 920).

Figure 11:
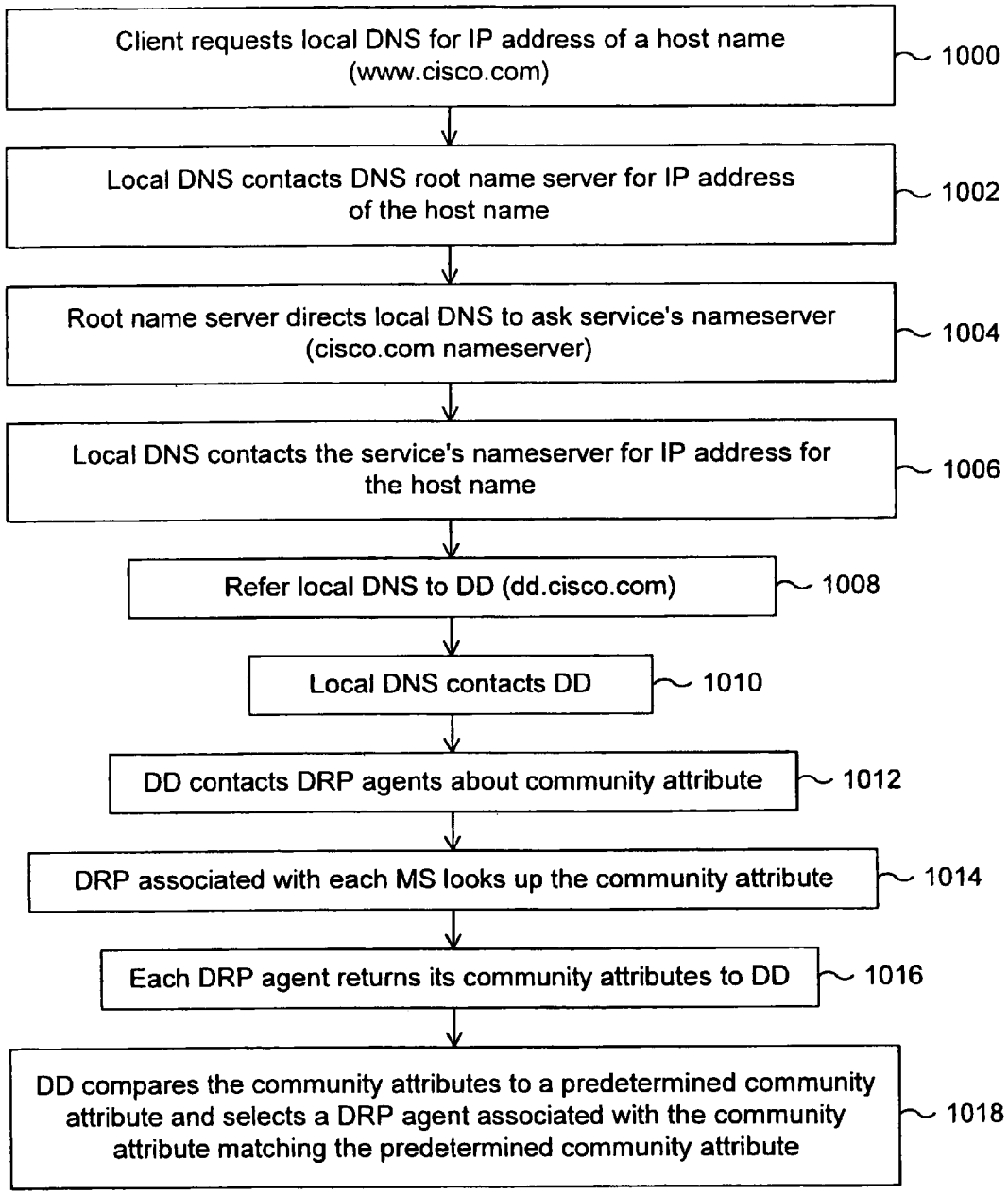
FIG. 11 is a flow diagram of a method according to an embodiment of the present invention for selecting a mirrored service, using a community attribute.

FIG. 11 is a flow diagram of an example of the method according to an embodiment of the present invention for selecting a mirrored service using community attributes. This example may be applied to either the system shown in FIG. 5 or the system shown in FIG. 6. In this example, the method utilizes a community attribute associated with the client's prefix. A community attribute is a string which is stored for each prefix which indicates some uniqueness for the prefix.

As before, the client requests a local DNS for an IP address of a host name, such as www.cisco.com (step 1000). The local DNS contacts the DNS root name server for an IP address of the host name (step 1002). The root name server directs the local DNS to ask the service's name server, such as cisco.com name server (step 1004). The local DNS then contacts the service's name server for an IP address for the host name (step 1006).

The local DNS is then referred to the distributed director, such as dd.cisco.com (step 1008). The local DNS then contacts the distributed director (step 1010). The distributed director then contacts the DRP agents about a community attribute associated with the prefix of the client (step 1012). DRP agents associated with each mirrored service looks up its community attribute associated with the client's prefix (step 1014). Each DRP agent then returns its community attributes to the distributed director (step 1016).

The distributed director compares the community attributes to a predetermined community attribute and selects a DRP agent associated with the community attribute matching the predetermined community attribute (step 1018). The predetermined community attribute may be selected in various ways. One such way is for the community attribute to be selected by a user, such as a network administrator.

Figure 12:
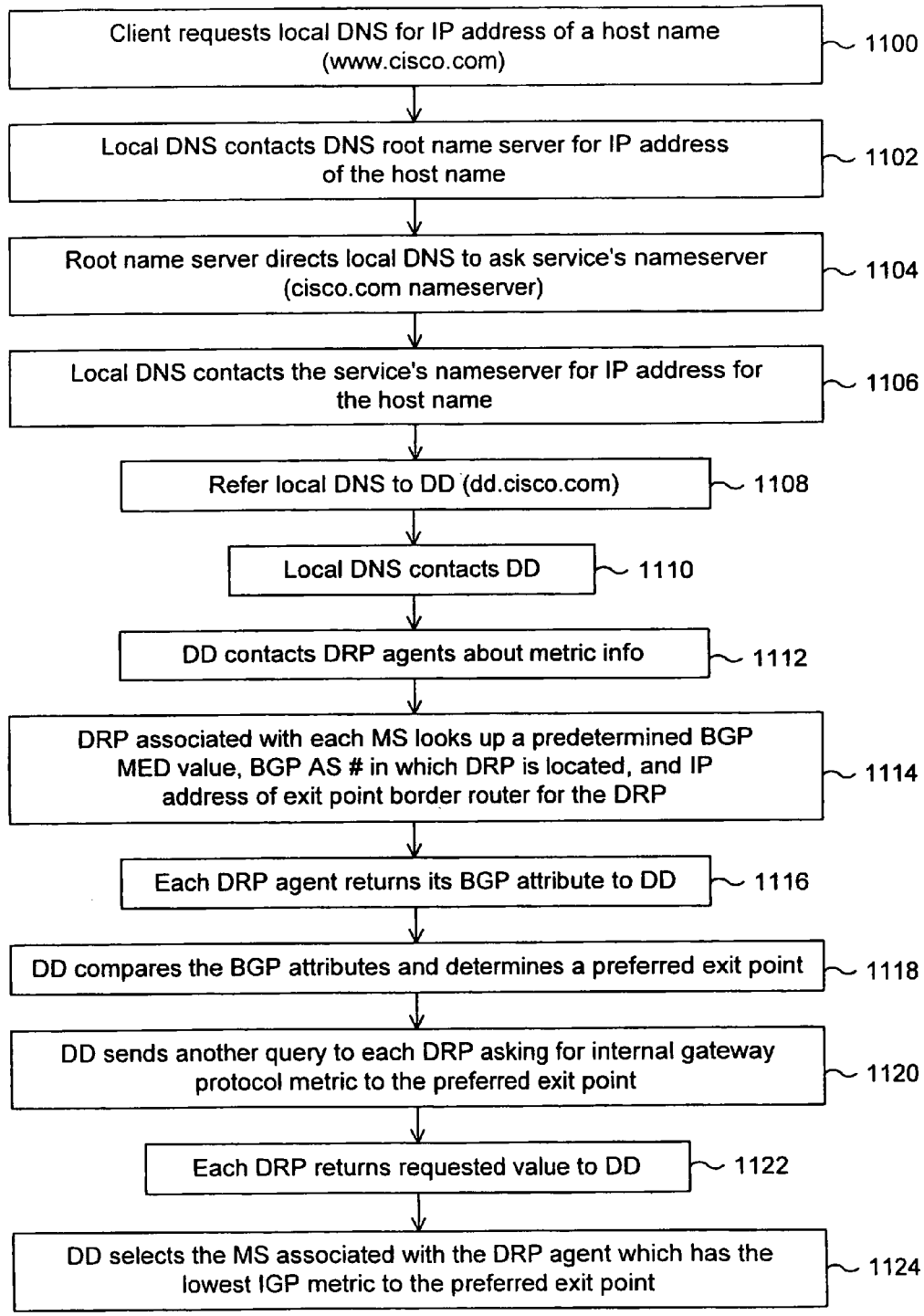
FIG. 12 is a flow diagram of a method according to an embodiment of the present invention for selecting a mirrored service, using internal gateway protocol (IGP) metric.

FIG. 12 is a flow diagram of a method according to an embodiment of the present invention for selecting a mirrored service using a BGP multi-exit discriminator (MED) value. As previously discussed in conjunction with FIG. 6, a multi-exit discriminator (MED) value dynamically indicates which link (552A–552C of FIG. 6) to use between connected autonomous systems (AS 500B' and AS 500A' of FIG. 6) by a border router to send data for a particular prefix. The method exemplified in FIG. 12 is preferably used in conjunction with the system of multiple mirrored services included in a single autonomous system, such as the system shown in FIG. 6. For further explanation of MED values, the description regarding FIG. 6 may be referenced.

A client requests a local DNS or IP address of a host name, such as www.cisco.com (step 1100). The local DNS then contacts the DNS root name server for an IP address of the host name (step 1102). The local DNS is eventually directed to ask the service's name server, such as cisco.com name server (step 1104).

The local DNS contacts the service's name server for an IP address for the host name (step 1106). The local DNS is then referred to a distributed director, such as dd.cisco.com (step 1108). The local DNS then contacts the distributed director (step 1110). The distributed director then contacts its DRP agents about metric information (step 1112).

The DRP agents associated with each mirrored service looks up a predetermined BGP MED value associated with a prefix of the client, a BGP autonomous system (AS) number in which the DRP agent is located, and an IP address of a border router for the DRP (step 1114). Each DRP agent then returns its BGP attributes to the distributed director (step 1116).

The distributed director compares the BGP attributes, selects a BGP MED which meets a predetermined criteria, such as the lowest BGP MED, and determines a preferred exit point (step 1118).

An exit point refers to a border router. The distributed director then sends another query to each DRP agent asking for an internal gateway protocol (IGP) metric to the preferred exit point (step 1120). For example, as shown in FIG. 6, if the border router 550f is selected as the preferred exit point, then each DRP agent 510, 516 and 518 would look up its internal gateway protocol metric to the border router 550f. The internal gateway protocol metric maybe the distance between the DRP agents 510, 516, 518, and the preferred border router 550f. Alternatively, the internal gateway protocol metric may be a measure of time for a packet sent from a DRP agent 510, 516, 518 to reach the preferred border router 550f. The internal gateway protocol metric may be stored in a table located in a DRP agent or a border router.

Each DRP agent then returns the requested value to the distributed director (step 1122). The distributed director then selects the mirrored service associated with the DRP agent which has the lowest internal gateway protocol metric to the preferred border router (step 1124).

Figure 13:
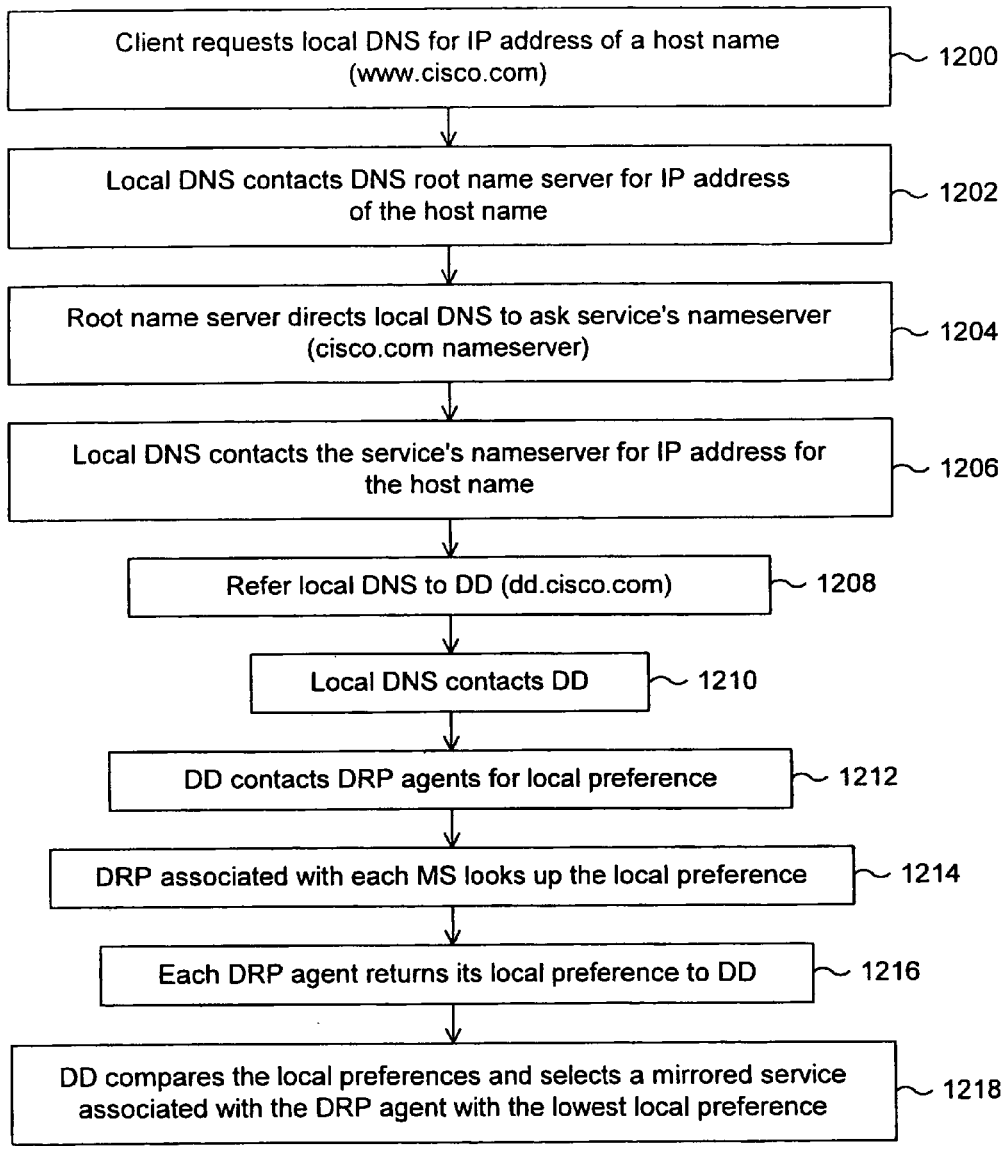
FIG. 13 is a flow diagram of a method according to an embodiment of the present invention for selecting a mirrored service, using local preferences.

FIG. 13 is a flow diagram of a method according to an embodiment of the present invention for selecting a mirrored service by using a local preference. This example is preferably used in conjunction with a system which includes multiple mirrored services within a single autonomous system, such as the system shown in FIG. 6. In this example, a mirrored service is selected by utilizing a local preference associated with the client's prefix.

A BGP local preference is a value configured on BGP border routers. Since there are typically multiple border routers in a single autonomous system, the BGP local preference indicates which border router is preferred to be used to communicate with a client with a particular prefix.

As in the other examples, a client requests the local DNS for IP address of a host name, such as www.cisco.com (step 1200). The local DNS then contacts its DNS root name server for the IP address of the host name (step 1202). The local DNS is then eventually directed to ask the service's name server, such as cisco.com name server (step 1204). The local DNS then contacts the service's name server for an IP address for the host name (step 1206).

The local DNS is then referred to the distributed director, such as dd.cisco.com (step 1208). The local DNS then contacts the distributed director (step 1210). The distributed director then asks the DRP agents for its local preference associated with the client's prefix (step 1212). Each DRP agent associated with a mirrored service then looks up the local preference associated with the client's prefix (step 1214). Each DRP agent then returns its local preference to the distributed director (step 1216). The distributed director then compares the local preferences and selects mirrored service associated with the DRP agent with a local preference which meets a predetermined criteria, such as the lowest local preference (step 1218).

Figure 14:
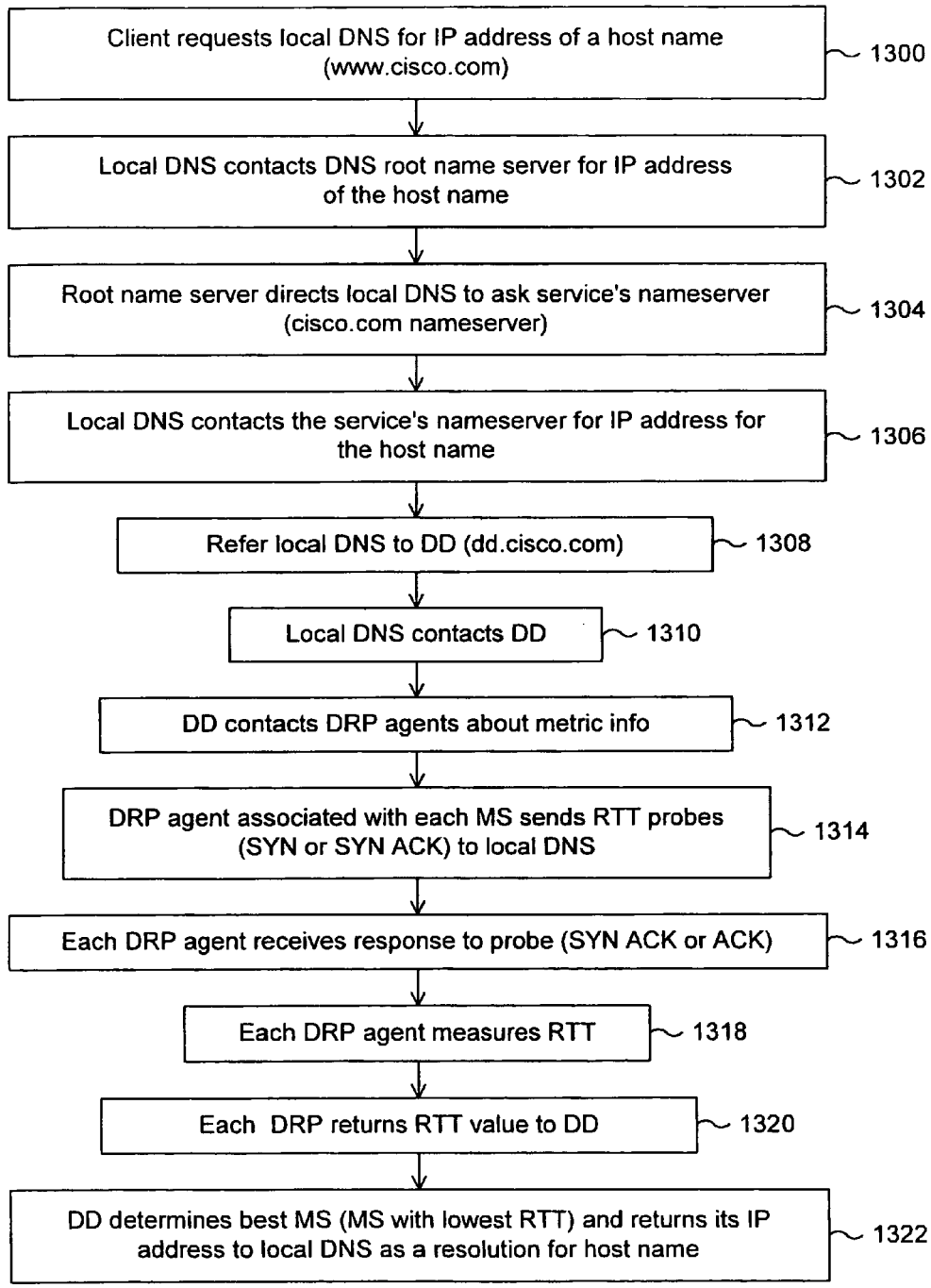
FIG. 14 is a flow diagram of a method according to an embodiment of the present invention for selecting a mirrored service using round trip time (RTT).

FIG. 14 is a flow diagram of a method according to an embodiment of the present invention for selecting a mirrored service using round trip time. As previously discussed, the client requests the local domain name server for an IP address of a host name, such as www.cisco.com (step 1300). The local domain name server then contacts a domain name server route name server for an IP address of the host name (step 1302). It is common for local domain name servers to contact a root name server for further direction. Root name servers and their uses are well known in the art.

The root name server then directs the local domain name server to ask the requested service's name server, such as cisco.com name server (step 1304). The local domain name server then contacts the service's name server for an IP address of the host name (step 1306). The local domain name server is then referred to the distributed director, for example to dd.cisco.com (step 1308). The local domain name server then contacts the distributed director (step 1310). The distributed director then contacts the distributed response protocol (DRP) agents, located near the various mirrored services, regarding metric information (step 1312).

Each DRP agent associated with a mirrored service sends a round trip time probe to the local domain name server (step 1314). The RTT probes are packets which are normally used during the establishment of a reliable connection between two points in a network, such as the Internet. Examples of these TCP packets include SYN, and SYN ACK.

Each DRP agent then receives a response to its RTT probe (step 1316). If an unsolicited SYN ACK was sent, then a Reset (RST) is expected to be returned. Accordingly, the round trip time between the issuance of the SYN ACK and the receipt of the RST may be measured or calculated.

Each DRP agent then measures its own round trip time (step 1318). Each DRP agent then returns its round trip time value to the distributed director (step 1320). The distributed director then determines a best mirrored service, such as a mirrored service with the lowest round trip time, and returns its IP address to the local domain name server as a resolution for the requested host name (step 1322).

FIG. 15 is an illustration of an example of service portion metrics. In the example shown in FIG. 15, there are five mirrored services A–E. A portion value is assigned to each of the services. In this example, service A has a portion value of seven, service B has a portion value of eight, service C has a portion value of two, service D has a portion value of two, and service E has a portion value of five. Note that, in this example, the sum of all portion values assigned to the five services is twenty-four (7+8+2+2+5). The portion of connections assigned to each of the five distributed services is calculated as follows: service A will receive 7/24 of the current number of incoming requests, service B will receive 8/24, service C will receive 2/24, etc. If a new service, service F is added with a portion metric of 10, it will get 10/34 and so on. Accordingly, the portion metric allows an administrator to finely tune the way load is distributed across multiple-distributed services. This metric enables one to statistically distribute more load to faster services, and distribute less load to slower services. Note that the portion metric can be used to provide traditional cyclical round-robin DNS functionality. Equal portions can be configured for each distributed service to provide this round-robin functionality.

Figure 16:
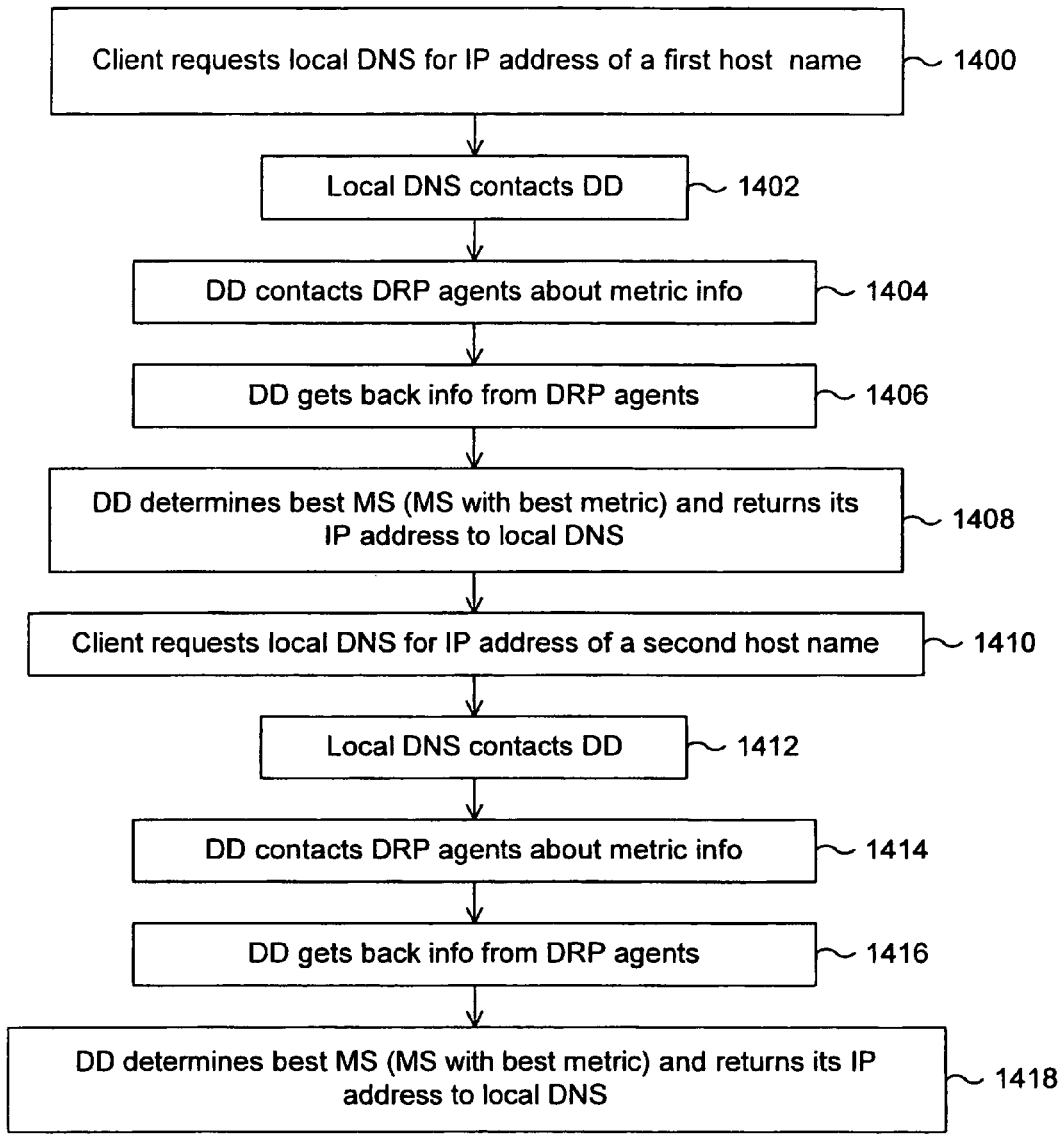
FIG. 16 is a flow diagram of a method according to an embodiment of the present invention for selecting a service, the method facilitating multiple host names.

FIG. 16 is flow diagram of a method according to an embodiment of the present invention for determining a mirrored service for a plurality of host names. In this embodiment, the distributed director may be utilized for determining a best mirrored service associated with a host name for more than one host name. The distributed director may perform multi-service support such that more than one sets of services may be supported. The different sets of services are non-mirrored services with respect to each other, although members of each individual set may be mirrored with respect to other members of the same set.

A client requests its local DNS for an IP address of a first host name (step 1400). The local DNS then contacts the distributed director (step 1402). The distributed director contacts it's DRP agents about metric information (step 1404), as previously described in conjunction with FIGS. 7–15. The distributed director then receives information back from the DRP agents (step 1406). The distributed director then determines the best mirrored service (the mirrored service with the best metric) and returns it's IP address to the local DNS (step 1408).

A client then requests its local DNS for the IP address of a second host name (step 1410). The local DNS contacts the same distributed director which resolved the IP address of the first host name (step 1412). The distributed director then contacts its DRP agents about metric information associated with the second host name (step 1414). The distributed director then gets back information from the DRP agents (step 1416), as previously described in conjunction with FIGS. 7–15. The distributed director then determines the best mirrored service (the mirrored service with the best metric) and returns its IP address to the local DNS as a resolution for the second host name (step 1418).

Figure 17A:
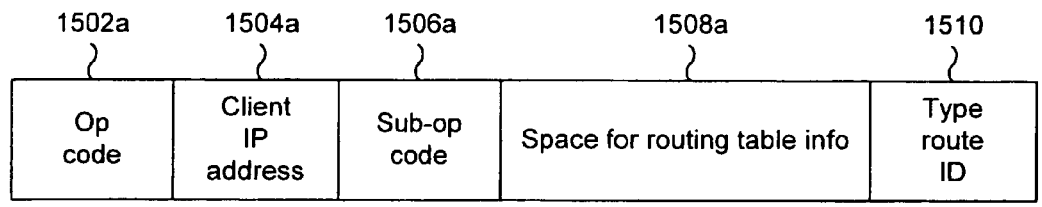
FIGS. 17a–17b illustrate query packets used for look-up information and measured metrics information, respectively.
Figure 17B:
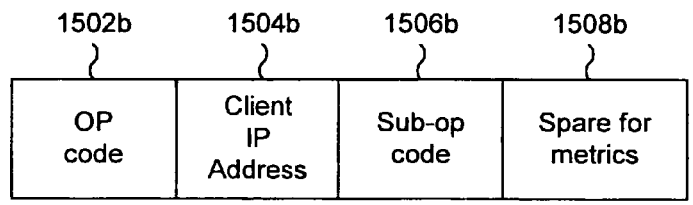

FIGS. 17A–17B illustrate query packets which may be sent from the distributed director to its DRP agents. FIGS. 17A–17B are examples of query packets that are in different classes of query packets. Examples of classes of query packets include fast queries, such as lookup queries, and slow queries, such as measured metrics queries. FIG. 17A illustrates a lookup query packet 1500, while FIG. 17B illustrates a measured metric query packet 1550. The lookup query packet 1500 is preferably used when the DRP agent can quickly respond to the query, such as when the DRP agent can simply look up the requested information in a routing table. The measured metric query packet 1550 is preferably used when the DRP agent is expected to take longer to respond to the requested information, such as when the DRP agent must send out a round trip time probe and wait for a response to measure round trip time.

The lookup query packet 1500 of FIG. 17A is shown to include an operation code (op code) 1502*a*. The op code 1502*a* of the lookup query packet 1500 indicates that this packet is a query packet and that this query packet is for a lookup query. Examples of a lookup query include requests for BGP metrics, MED metrics, and IGP metrics. These lookup queries may simply be looked up in a routing table at the DRP location.

The lookup query 1500 also includes a client IP address 1504*a*. The client IP address identifies the location of the client who is requesting the IP address of a host name. A sub-op code 1506*a* is also included in the lookup query packet 1500. The sub-op code 1506*a* indicates which specific lookup metrics the distributed director is requesting. For example, the sub-op code 1506*a* may indicate that only the BGP and MED metrics are being requested. Accordingly, the DRP is not required to look up and send back information regarding all lookup metrics. When the DRP looks up the requested lookup metrics identified by the sub-op code 1506*a*, then this information is inserted into a space provided for routing table information 1508*a*. Accordingly, if there are ten possible lookup metrics but the distributed director only asks for one of those options, as indicated by the sub-op code 1506*a*, the DRP would only look up the one requested metric.

The lookup query packet 1500 also includes a type route ID 1510. For DRP internal metrics, there are different types of DRP internal metrics which may be very difficult, if not impossible to compare. For example, DRP internal metrics includes intermediate system intermediate system (ISIS), interior gateway routing protocol (IGRP), enhanced interior gateway protocol (EIGRP), routing information protocol (RIP), and open shortest path first (OSPF). The type route ID 1510 is included in the lookup query packet 1500 to notify the distributed director of the type route identification so that metrics which can be compared can be identified. Further details of the use of type route ID 1510 will later be discussed in conjunction with FIGS. 19 and 20.

FIG. 17B illustrates a measured metric query packet 1550. The measured metric query packet 1550 includes an op code 1502*b* which indicates that it is a measured metric query. A client IP address 1504*b* is also included, indicating the address of the client who originated the request for host name. Additionally, a sub-op code 1506*b* indicates which measured metric the distributed director is requesting, such as round trip time. The DRP may then insert the requested measured metric identified by the sub-op code 1506*b* and insert it into a space for measured metrics 1508*b*.

Figure 18:
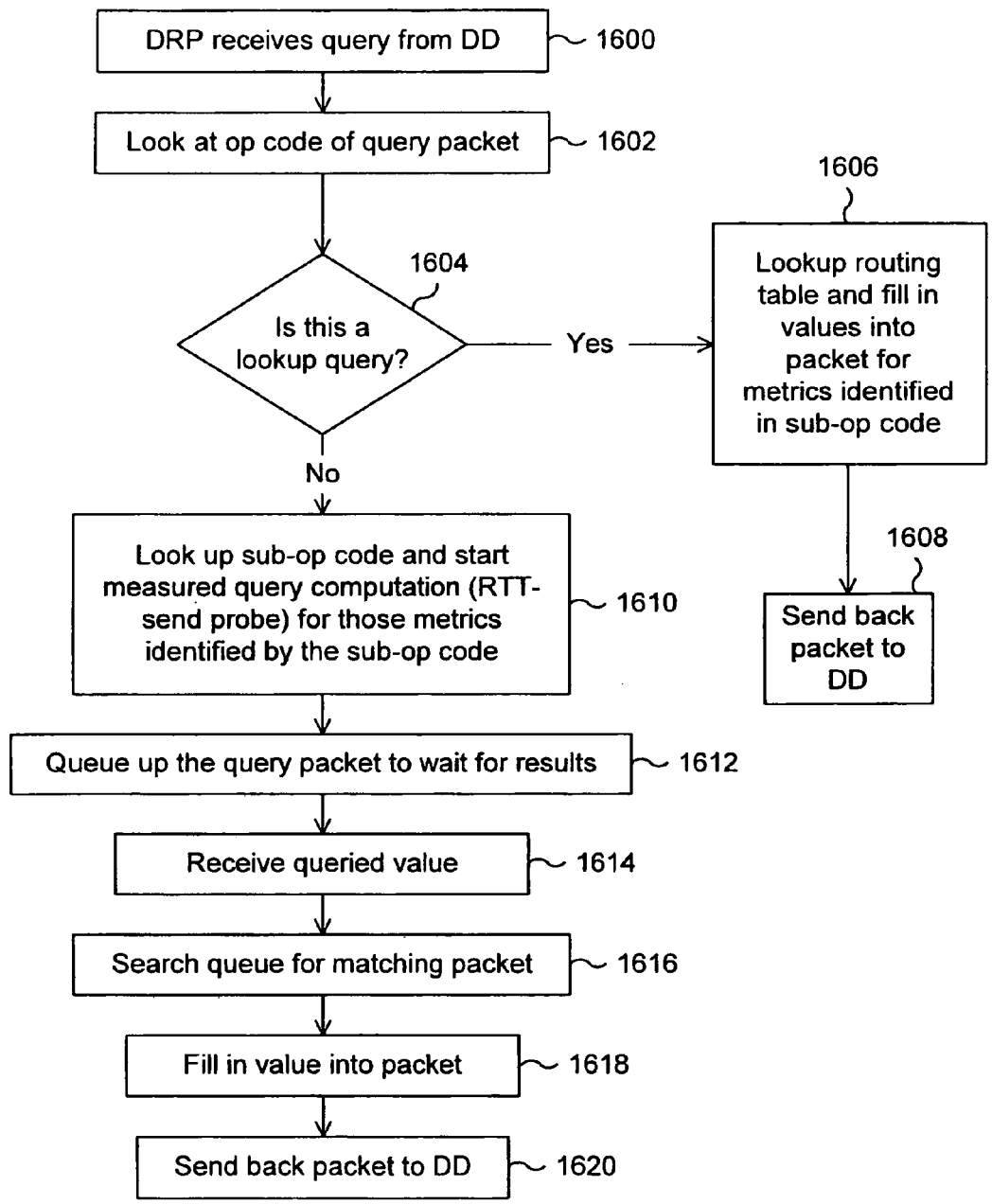
FIG. 18 is a flow diagram of a method according to an embodiment of the present invention for retrieving information related to a service.

FIG. 18 is a flow diagram of a method according to an embodiment of the present invention for collecting information related to a mirrored service. A DRP receives a query from a distributed director (step 1600). The query may be authenticated using known authentication methods, such as MD5. The op code of the query packet is analyzed (step 1602) to determine if this query packet is a lookup query (step 1604). If it is determined that this query packet is a lookup query, then a routing table is looked up and the looked up values are filled into the query packet for metrics identified in the sub-op code (step 1606). The resulting packet is then sent back to the distributed director (step 1608).

If the query packet is not a lookup query (step 1604), then the sub-op code of the query packet is analyzed and a measured query computation is initiated for those metrics identified by the sub-op code (step 1610). For example, a round trip time probe is sent. The query packet is then queued to wait for results (step 1612). The queried value is then received (step 1614). The queue is then searched for the matching packet of the received query value (step 1616). The received queried value is then filled into the matching packet (step 1618). The filled packet is then sent back to the distributed director (step 1620).

Note that the examples shown in FIGS. 17A–17B and 18 assume that there are two types of query packets (lookup and measured metrics). However, these are merely examples to facilitate in understanding the underlying principles of an embodiment of the present invention. There may be finer granularities and a large plurality of different types of query packets may be used. Regardless of the number of different types of query packets, the op code and the sub-op code can allow the DRP to distinguish between the various types.

FIG. 19 is an illustration of a comparison of various internal gateway protocol IGP metrics. As previously mentioned, some IGP metrics are not comparable and comparing two different, non-comparable types of IGP metrics may result in meaningless selections. Accordingly the DRP indicates a route type ID, such as route type ID 1510 of FIG. 17A, which may be utilized by the distributed director for comparisons. In the example shown in FIG. 19, four different mirrored services (MS1–MS4) are compared. MS1 has a route type of ISIS, MS2 has a route type of ISIS, MS3 has a route type of OSPF, and MS4 has a route type of OSPF. A type number is also assigned to each route type. Some route types, such as ISIS or OSPF, may also have various types within their category. For example, different ISIS route types include L1 and L2, while different OSPF route types include inter-area and intra-area.

Accordingly, MS1 has a type number of 1 while MS2 has a type number of 2. MS3 and MS4 both have type numbers 3. Assume in this example that the resulting IGP metric derived by the DRP for MS1 is 10, MS2 is 20, MS3 is 30, and for MS4 is 40.

Figure 20:
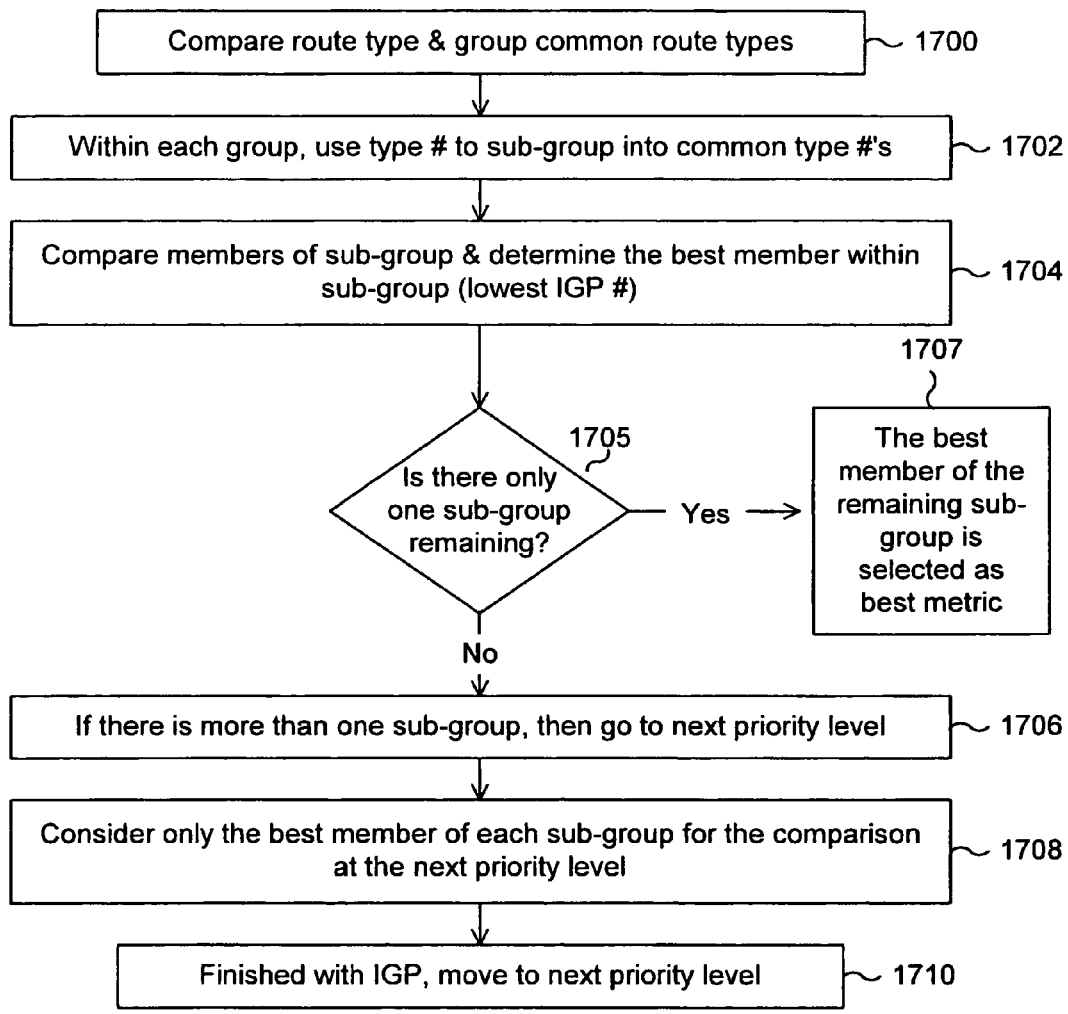
FIG. 20 is flow diagram of a method according to an embodiment of the present invention for comparing metrics related to services.

The example of FIG. 19 may be best understood in conjunction with FIG. 20. FIG. 20 is a flow diagram of a method according to an embodiment of the present invention for comparing metrics for IGP metrics. The flow diagram of FIG. 20 is an example of step 608 of FIG. 7, wherein the distributed director runs a selection algorithm based on configured priority and weights for configured metrics.

The route type is compared and common route types are grouped (step 1700). For example, MS1 and MS2 of FIG. 19 may be grouped together since they both have a route type of ISIS, while MS3 and MS4 may be grouped together since they have a common route type of OSPF.

Within each of these groups, the type number is used to sub-group into common type numbers (step 1702). In the example shown in FIG. 19, the ISIS group has a sub-group with type number 1 and another sub-group with type number 2, while the group OSPF only has a single type number group.

Members of sub-groups are then compared and the best member within each subgroup is determined (step 1704). For example, the lowest IGP metric number may be determined as the best member within the sub-group. In the example shown in FIG. 19, MS1 and MS2 are each alone in their sub-groups. Accordingly, neither MS1 nor MS2 are compared. However, MS3 and MS4 are both in the same sub-group. Accordingly, IGP metric 30 of MS3 is compared with IGP metric 40 of MS4. The lowest IGP metric is then selected. In this example, MS3 is selected out of its sub-group.

It is then determined whether there is more than one sub-group remaining (step 1705). If there is only one sub-group remaining, then the member selected out of that remaining sub-group is selected as the best metric (step 1707).

If there is more than one sub-group, a comparison is performed at a next priority level (step 1706). In the example shown in FIG. 19, the next priority level is analyzed since MS1, MS2, and MS3 cannot be compared, since each of these mirrored services are in an incomparable category with each other. When there is more than one sub-group in the final comparison, it is assumed that they cannot be compared to each other. The next priority level is the next metric to be compared, such as round trip time. The priority levels are initially configured by the user, as described in step 600 of FIG. 7.

Only the best member within each subgroup, determined in step 1704, are considered in the comparison at the next priority level (step 1708). In the example shown in FIG. 19, MS4 was not selected in its sub-group. Accordingly, MS4 will not be compared in the next priority level comparison.

If all IGP metrics are compared without a meaningful result, then the next priority level metric comparison is performed (step 1710). A meaningful result includes a result wherein all remaining members of a comparison are compatible with each other for a proper comparison to facilitate in determining a "best" mirrored service.

A system and method for selecting a mirrored service in a network environment has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for selecting a mirrored service comprising:
   configuring a distributed director with criteria for service selection;
   assigning a weight to each criterion;
   assigning a priority to each criterion;
   determining that metric information is required by at least one of the criteria;
   requesting metric information for each mirrored service for each criterion for which metric information is required;
   comparing the requested metric information of at least one of the criteria with the highest priority for each mirrored service;
   selecting the service with the fastest metric information with respect to the highest priority criterion;
   determining that the metric information of the highest priority criterion is equal for two or more mirrored services and in response comparing the metric information of the criterion with the next highest priority for each mirrored service; and
   selecting the service with the fastest metric information with respect to the next highest priority criterion.

2. The method of claim 1 wherein the criteria comprises members from the set consisting of a portion scheme, an administrative cost scheme, a random scheme, a round trip time scheme, an external metrics scheme, an internal metrics scheme, a server metrics scheme, a local preferences scheme, a community attribute scheme, and a BGP attribute scheme.

3. A system for selecting a mirrored service comprising:
   a distributed director operable to:
      be configured with criteria for service selection;
      assign a weight to each criteria;
      assign a priority to each criterion;
      determine that metric information is required by at least one of the criteria;
      request metric information for each mirrored service for each criterion for which metric information is required;
      apply a selection algorithm, said algorithm comprising
      comparing the requested metric information of at least one of the criteria with the highest priority for each mirrored service;
      selecting the service with the fastest metric information with respect to the highest priority criterion;
      determining that the metric information of the highest priority criterion is equal for two or more mirrored services and in response comparing the metric information of the criterion with the next highest priority for each mirrored service; and
      selecting the service with the fastest metric information with respect to the next highest priority criterion.

4. The system of claim 3 wherein the criteria comprises members from the set consisting of a portion scheme, an administrative cost scheme, a random scheme, a round trip time scheme, an external metrics scheme, an internal metrics scheme, a server metrics scheme, a local preferences scheme, a community attributes scheme, and a BGP attribute scheme.

5. A distributed director comprising:
   logic encoded in a computer readable media operable to:
      be configured with criteria for service selection;
      assign a weight to each criterion;
      assign a priority to each criterion;
      determine that metric information is required by at least one of the criteria
      request metric information for each mirrored service for each criterion for which metric information is required;
      apply a selection algorithm said algorithm comprising
      comparing the requested metric information of at least one of the criteria with the highest priority for each mirrored service;
      selecting the service with the fastest metric information with respect to the highest priority criterion;
      determining that the metric information of the highest priority criterion is equal for two or more mirrored services and in response comparing the metric information of the criterion with the next highest priority for each mirrored service; and
      selecting the service with the fastest metric information with respect to the next highest priority criterion.

6. The distributed director of claim 5 wherein the criteria comprises members from the set consisting of a portion scheme, an administrative cost scheme, a random scheme, a round trip time scheme, an external metrics scheme, an internal metrics scheme, a server metrics scheme, a local preferences scheme, a community attributes scheme, and a BGP attribute scheme.

* * * * *